United States Patent [19]

Kuno et al.

[11] Patent Number: 4,501,284

[45] Date of Patent: Feb. 26, 1985

[54] SPEED CONTROL METHOD AND SYSTEM FOR AUTOMOTIVE VEHICLES

[75] Inventors: Akira Kuno, Oobu; Yoshio Shinoda, Aichi, both of Japan

[73] Assignee: Nippon Soken, Inc., Nishio, Japan

[21] Appl. No.: 435,603

[22] Filed: Oct. 20, 1982

[30] Foreign Application Priority Data

Oct. 21, 1981 [JP] Japan .................. 56-168314

[51] Int. Cl.³ ............................................. F02D 29/02
[52] U.S. Cl. ................................ 123/352; 180/179; 364/431.07
[58] Field of Search ................ 123/352, 354; 180/176, 180/179; 364/431.07

[56] References Cited

U.S. PATENT DOCUMENTS

| | | | |
|---|---|---|---|
| 4,250,854 | 2/1981 | Matsui et al. | 123/352 |
| 4,325,336 | 4/1982 | Kuno et al. | 123/350 |
| 4,328,776 | 5/1982 | Kuno et al. | 123/352 |
| 4,359,125 | 11/1982 | Shinoda et al. | 123/352 |

Primary Examiner—Andrew M. Dolinar
Attorney, Agent, or Firm—Cushman, Darby & Cushman

[57] ABSTRACT

A vehicle speed control method comprises the steps of dividing a frequency corresponding with the actual speed by a frequency divisional ratio determined inversely proportional to a desired speed, producing a timing signal with the divided frequency, calculating a time difference between a predetermined time period corresponding with a desired speed and the total of constant time periods defined by a time period of the timing signal, calculating a time difference between both the totals of constant time periods defined by respective time periods of the preceding and following timing signals, and producing a correction signal related to the calculated time differences such that an output signal is produced to actuate a control element so as to control the quantity of fuel supplied into an engine.

8 Claims, 10 Drawing Figures

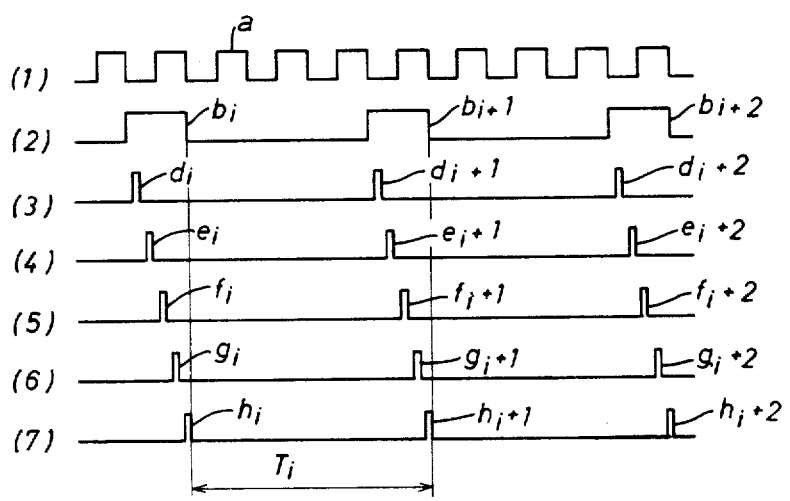
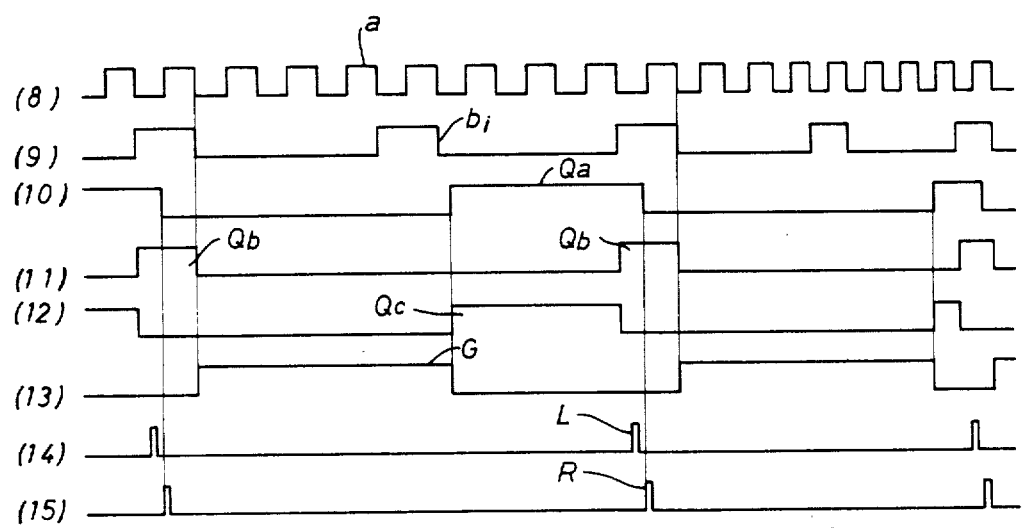
Fig. 3

SPEED CONTROL METHOD AND SYSTEM FOR AUTOMOTIVE VEHICLES

BACKGROUND OF THE INVENTION

The present invention relates to a speed control method and system for automotive vehicles, and more particularly to an improvement of a speed control method and system for an automotive vehicle of the type in which the quantity of fuel supply into the engine is controlled in accordance with the actual speed of the vehicle and the rate of change of the actual speed in relation to a desired command speed.

In such a speed control system as described in U.S. Pat. No. 4,250,854 issued on Feb. 7, 1981, a speed-difference calculation circuit is provided to calculate a first time difference between a predetermined period of time corresponding with a desired vehicle speed and the actual period of time corresponding with the actual vehicle speed, and an acceleration calculation circuit is also provided to calculate a second time difference between the preceding and following actual periods of time corresponding with the actual vehicle acceleration. Thus, a correction signal is obtained in dependence on each value of the first and second calculated time differences to control the quantity of fuel supply into the engine so as to maintain the speed of the vehicle at the desired value.

In the speed control system described above, the actual period of time corresponding with the actual speed of the vehicle changes inversely proportional to the actual vehicle speed. This means that resolution or resolving power in calculation of each value of the first and second time differences changes in dependence on change of the vehicle speed and that the correction signal will be erroneously obtained due to change of the resolution in calculation. This results in difficulty of precise control of fuel supply into the engine over a wider range of the vehicle speed.

SUMMARY OF THE INVENTION

For the purpose of overcoming the above-noted difficulty, the inventors have found the fact that the resolution in calculation of each value of the first and second time differences may be substantially maintained in a constant if a total period of time (NT) given by the number (N) of speed signals corresponding to change of the actual vehicle speed or a difference between the actual and desired speeds in relation to each period of time (T) of the speed signals is calculated in dependence on each period of time (t) of clock signals and further a value of TN/t is substantially maintained in a constant in relation to selective modification of the number (N) of the speed signals, each period of time (T) of the speed signals and each period of time (t) of the clock signals.

It is, therefore, a primary object of the present invention to provide an improved speed control method and system capable of maintaining the resolution in calculation of each value of the first and second time differences constant irrespectively of change of the command speed level on a basis of the above fact.

According to an aspect of the present invention there is provided a speed control system for an automotive vehicle driven by an internal combustion engine under control of control means for controlling the quantity of fuel supplied into the engine to maintain the actual speed of the vehicle to a desired value, which comprises:

first means for producing a speed signal with a frequency responsive to the actual vehicle speed;

second means for producing a series of clock signals at a constant frequency;

third means for producing a command signal indicative of the desired vehicle speed;

fourth means for determining a divisional frequency ratio inversely proportional to a value corresponding with the desired vehicle speed and for dividing the actual frequency of the speed signal by the divisional frequency ratio to produce a timing signal with the divided frequency;

fifth means for calculating a first difference between values of the command and speed signals in accordance with the clock signals defined by a period of time of the timing signal, the fifth means producing a first difference signal indicative of the calculated first difference;

sixth means for calculating a second difference between values of the successive speed signals in accordance with the clock signals defined by each period of time of the successive timing signals, the sixth means producing a second difference signal indicative of the calculated second difference;

seventh means responsive to the first and second difference signals for producing a correction signal related to the calculated first and second differences; and actuator means for actuating the control means in response to the correction signal.

According to another aspect of the present invention there is provided a speed control method for an automotive vehicle driven by an internal combustion engine under control of control means for controlling the quantity of fuel supplied into the engine to maintain the actual speed of the vehicle to a desired value, which comprises the steps of:

producing a speed signal with a frequency responsive to the actual vehicle speed;

producing a series of clock signals at a constant frequency;

producing a command signal indicative of the desired vehicle speed;

determining a divisional frequency ratio inversely proportional to a value corresponding with the desired vehicle speed and dividing the actual frequency of the speed signal by the divisional frequency ratio to produce a timing signal with the divided frequency;

calculating a first difference between values of the command and speed signals in accordance with the clock signals defined by a period of time of the timing signal and producing a first difference signal indicative of the calculated first difference;

calculating a second difference between values of the successive speed signals in accordance with the clock signals defined by each period of time of the successive timing signals and producing a second difference signal indicative of the calculated second difference;

producing, responsive to the first and second difference signals, a correction signal related to the calculated first and second differences; and actuating the control means in response to the correction signal.

According to still another aspect of the present invention there is provided a speed control method for an automotive vehicle driven by an internal combustion engine under control of control means for controlling the quantity of fuel supplied into the engine to maintain the actual speed of the vehicle to a desired value, which comprises the steps of:

producing a speed signal with a period of time responsive to the actual vehicle speed;

producing a command signal indicative of the desired vehicle speed;

producing a series of clock signals at a constant frequency;

modifying each of the clock signals in frequency into a modified clock signal with a frequency inversely proportional to an instant period of time of the speed signal;

calculating a first difference between values of the command and speed signals in accordance with the modified clock signals and producing a first difference signal indicative of the calculated first difference;

calculating a second difference between values of the successive speed signals in accordance with the modified clock signals and producing a second difference signal indicative of the calculated second difference;

producing, responsive to the first and second difference signals, a correction signal related to the calculated first and second differences; and actuating the control means in response to the correction signal.

According to further aspect of the present invention there is provided a speed control method for an automotive vehicle driven by an internal combustion engine under control of control means for controlling the quantity of fuel supplied into the engine to maintain the actual speed of the vehicle to a desired value, which comprises the steps of:

producing a speed signal with a frequency responsive to the actual vehicle speed;

producing a series of clock signals at a constant frequency;

producing a command signal indicative of the desired vehicle speed;

modifying a period of time of the speed signal in inversely proportional relative relationship with the number of the speed signals corresponding with either one of changes of the actual vehicle speed or a difference between the actual and command speeds;

producing a timing signal with a period of time defined by the modified period of time of the speed signal;

calculating a first difference between values of the command and speed signals in accordance with the clock signals defined by a period of time of the timing signal and producing a first difference signal indicative of the calculated first difference;

calculating a second difference between values of the successive speed signals in accordance with the clock signals defined by each period of time of the successive timing signals and producing a second difference signal indicative of the calculated second difference;

producing, responsive to the first and second difference signals, a correction signal related to the calculated first and second differences; and actuating said control means in response to the correction signal.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 3 illustrates waveforms obtained at various points in the wave shaper and timing signal generator;

DESCRIPTION OF THE PREFERRED EMBODIMENT

Figure 1:
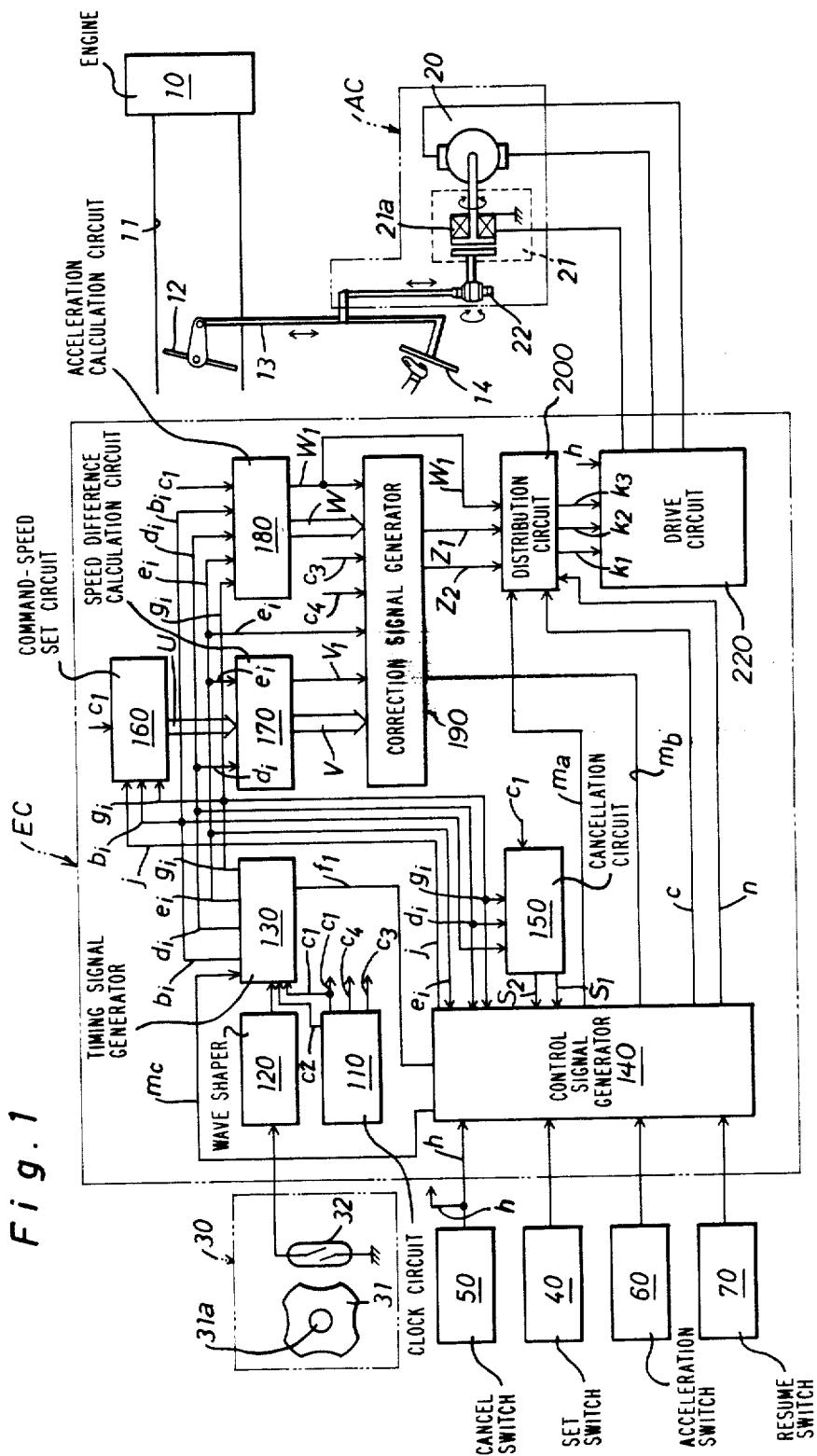
FIG. 1 is a schematic block diagram of a speed control apparatus in accordance with the present invention which is adapted to an automotive vehicle.

Referring now to the drawings, in particular to FIG. 1 there is illustrated a speed control apparatus in accordance with the present invention which is adapted to an internal combustion engine 10 of an automotive vehicle. The speed control apparatus comprises a throttle actuator AC which is operatively coupled with a throttle valve 12 provided within an induction passage 11 of engine 10. The throttle actuator AC comprises an electric reversible motor 20 which is coupled with a rack-and-pinion 22 by an electromagnetic clutch mechanism 21. The clutch mechanism 21 is provided with an electromagnetic coil 21a which is energized to engage the clutch mechanism 21 so as to connect the rack-and-pinion 22 to the motor 20. Upon deenergization of the coil 21a, the clutch mechanism 21 is disengaged to disconnect the rack-and-pinion 22 from the motor 20. The rack-and-pinion 22 is linked by a rod 13 with the throttle valve 12 to move the rod 13 downward in dependence upon the clockwise rotation of motor 20 under engagement of clutch mechanism 21 so as to increase the actual opening angle of throttle valve 12. When the motor 20 rotates counterclockwise under engagement of clutch mechanism 21, the rack-and-pinion 22 moves the rod 13 upward to decrease the actual opening angle of throttle valve 12. In addition, an accelerator pedal 14 for the vehicle is linked with the throttle valve 12 through the rod 13 to fully close the throttle valve 12 when released under disengagement of clutch mechanism 21.

Figure 4:
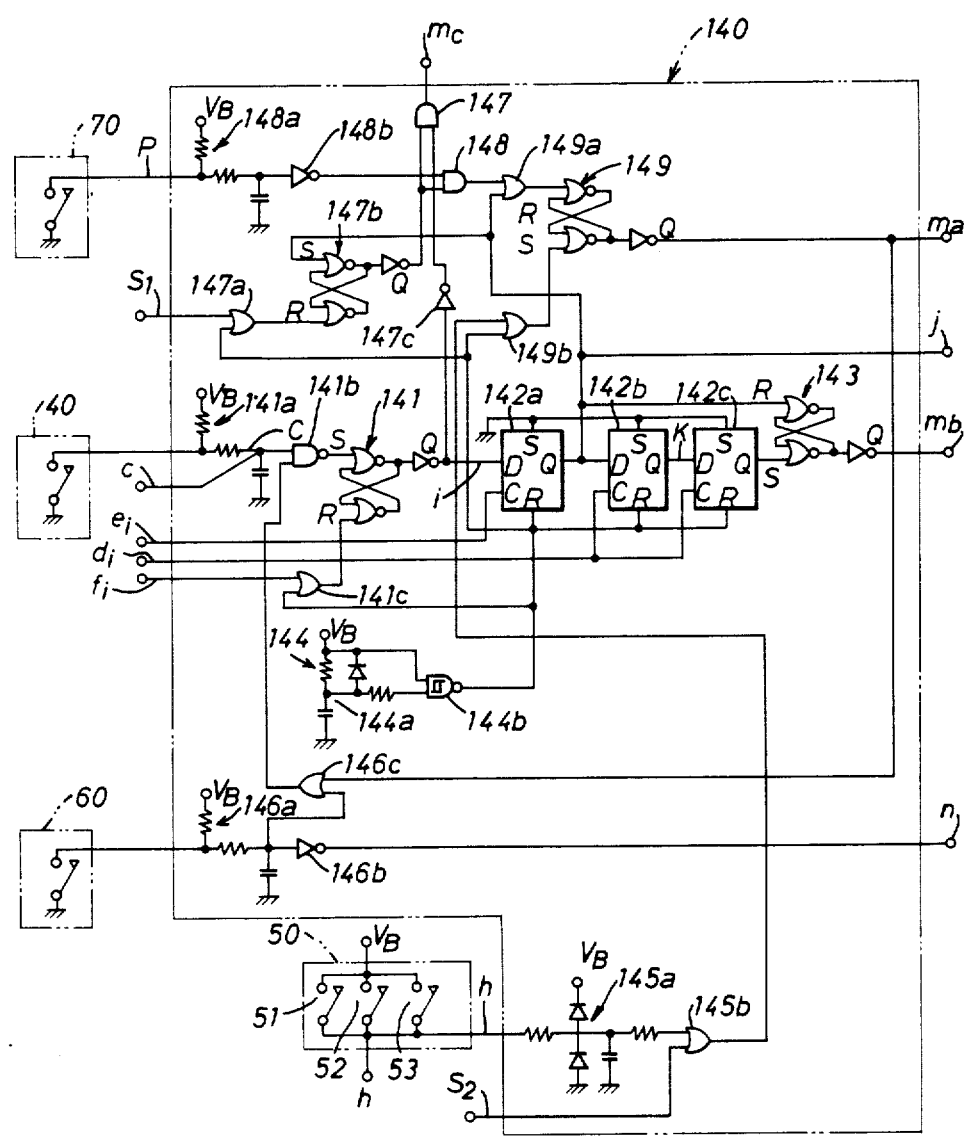
FIG. 4 is a circuit diagram of the control signal generator shown in block form of FIG. 1 in relation to the various switches.

The speed control apparatus also comprises an electronic control circuit EC which is connected to the throttle actuator AC and also to a speed sensor 30 and various switches 40, 50, 60 and 70. The speed sensor 30 includes a reed switch 32 which is located in magnetic coupling relationship with a disc 31, made from a permanent magnet, coupled with a flexible cable 31a of a speedometer for the vehicle. The reed switch 32 is repetitively opened and closed due to rotation of the disc 31 to produce a series of electric signals respectively with a frequency proportional to the actual vehicle speed. The set switch 40 is of a normally open type, as shown in FIG. 4 and is temporarily closed at a desired or command speed of the vehicle to produce an electric signal. The cancel switch 50 is provided with brake, clutch and parking switches 51, 52 and 53 which are respectively in the form of a normally open type and connected in parallel to each other (see FIG. 4.). The brake switch 51 is closed upon depression of a foot brake pedal of the vehicle, the clutch switch 52 is closed upon actuation of a clutch pedal of the vehicle, and the parking switch 53 is also closed upon manipulation of a parking mechanism of the vehicle. When one of the switches 51, 52 and 53 is closed, the cancel switch 50 produces a release signal h (see FIG. 5) for making the control circuit EC inoperative. The acceleration switch 60 is of a normally open type (see FIG. 4) and manually closed to produce an electric signal, and the resume switch 70 is also in the form of a normally open type and manually closed to produce a resume signal p (see FIG. 5).

Figure 2:
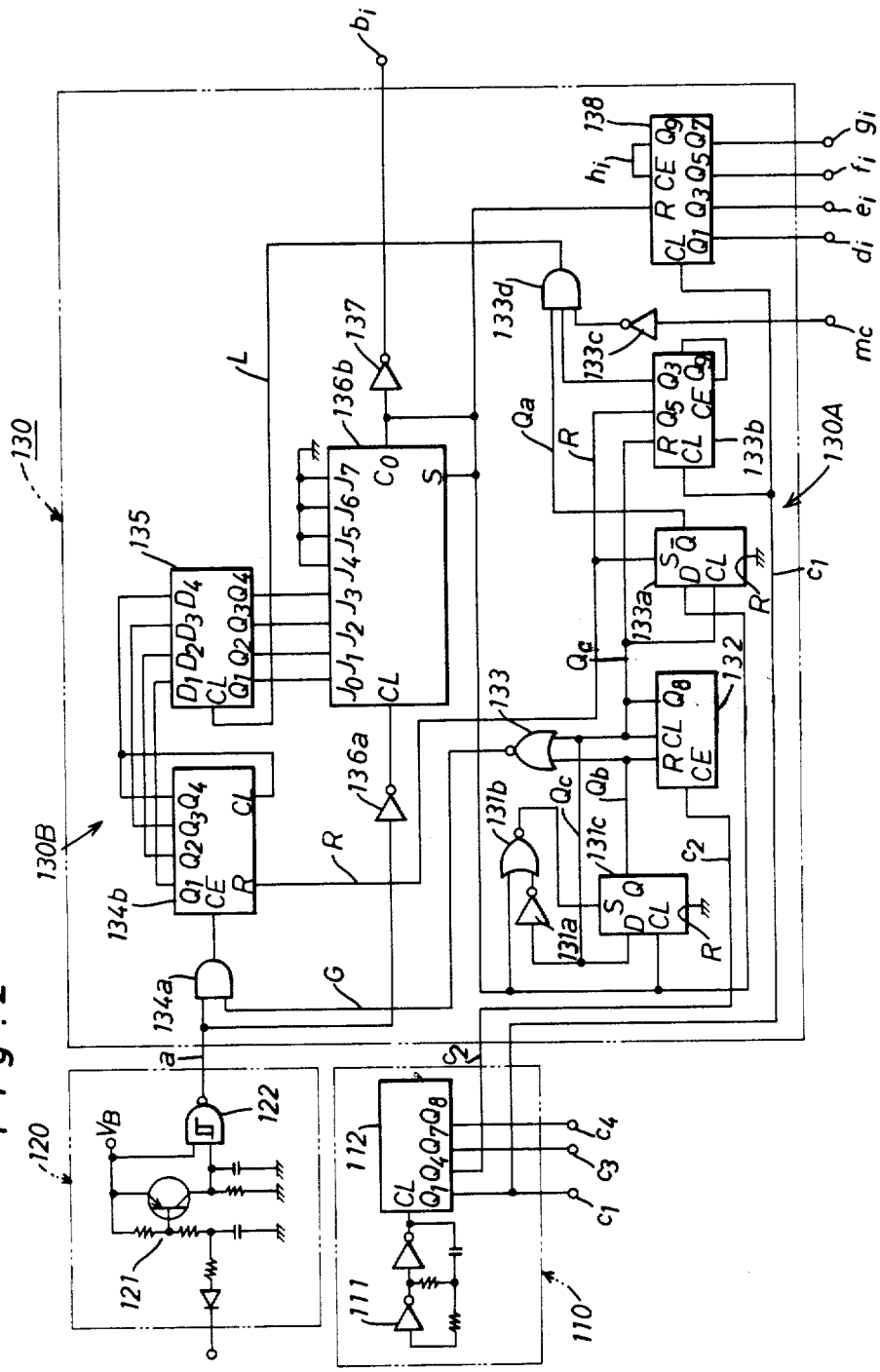
FIG. 2 is circuit diagrams of the wave shaper, clock circuit and timing signal generator respectively shown in block form in FIG. 1.

The electronic control circuit EC includes a clock circuit 110, and a timing signal generator 130 connected through a wave shaper 120 to the speed sensor 30, as shown in FIGS. 1 and 2. The clock circuit 110 includes a binary counter 112 which counts a series of oscillating signals issued from an oscillator 111 and produces each series of clock signals $C_1$, $C_2$, $C_3$ and $C_4$ respectively at its output terminals $Q_1$, $Q_4$, $Q_7$ and $Q_8$. In the embodiment, frequencies of the clock signals $C_1$, $C_2$, $C_3$ and $C_4$ are determined as, for example, 8 KHz, 1 KHz, 125 Hz and 62.5 Hz respectively. The wave shaper 120 comprises a switching circuit 121 for reshaping each of the electric signals from speed sensor 30 into a reshaped signal in sequence to be applied to a NAND-gate 122 of CD 4093 type manufactured by RCA in U.S.A. NAND-gate 122 has schmidt-trigger function to generate a rectangular pulse signal a (see FIG. 3) sequentially in response to each reshaped signal from switching circuit 121.

The timing signal generator 130 is provided with a signal generator 130A connected to the clock circuit 110 and a control signal generator 140 (see FIGS. 1 and 4) and with a frequency divider 130B connected to the wave shaper 120 and signal generator 130A. The signal generator 130A comprises a NOR-gate 133 which is connected through a binary counter 132 to the clock circuit 110 and also connected through a D-flip flop 131c, a NOR-gate 131b and an inverter 131a to a programmable down counter 136b included in the frequency divider 130B. NOR-gate 131b acts to produce a high level signal in response to a divisional frequency signal with a low level issued from the down counter 136b under control of the inverter 131a responsive to a high level signal Qc (see FIG. 3) issued from the binary counter 132. The high level signal from NOR-gate 131b disappears in response to disappearance of one of the divisional frequency signal from down counter 136b and the high level signal Qc from binary counter 132.

During generation of the high level signal Qc from binary counter 132, D-flip flop 131c acts to produce a high level signal Qb (see FIG. 3) at its output terminal Q upon receiving one of the divisional frequency and high level signals respectively from down counter 136b and NOR-gate 131b. The high level signal Qb from D-flip flop 131c drops to a low level in response to disappearance of the divisional frequency signal from down counter 136b during disappearance of the high level signal Qc. The binary counter 132 is reset upon receipt of the high level signal Qb from D-flip flop 131c and counts a series of the clock signals $C_2$ from clock circuit 110 to generate the above-noted high level signal Qc at its output terminal $Q_8$. The binary counter 132 is also responsive to the high level signal Qc to stop the counting operation thereof. NOR-gate 133 serves to produce a gate signal G (see FIG. 3) when each of the high level signals Qb and Qc respectively from D-flip flop 131c and binary counter 132 disappears. The gate signal G from NOR-gate 133 drops to a low level in response to one of the high level signals Qb, Qc.

The signal generator 130A also comprises a decade counter 133b connected to the clock circuit 110 and binary counter 132, and an AND-gate 133d which is connected to the decade counter 133b and a D-flip flop 133a and connected through an inverter 133c to the control signal generator 140. The decade counter 133b is reset in response to the high level signal Qc from binary counter 132 to count a series of the clock signals $C_1$ from clock circuit 110 such that it produces a high level signal at its output terminal $Q_3$, a high level or reset signal R (see FIG. 3) at its output terminal $Q_5$ and a high level or inhibiting signal at its output terminal $Q_9$ in sequence. The inhibiting signal from the output terminal $Q_9$ of decade counter 133b is utilized to inhibit the count operation of counter 133b. D-flip flop 133a acts to produce a high level signal Qa (see FIG. 3) at its output terminal $\overline{Q}$ upon receipt of the high level signal Qc from binary counter 132 during generation of the divisional frequency signal from down counter 136b. The high level signal Qa from D-flip flop 133a drops to a low level in response to one of the reset signal R from decade counter 133b and the high level signal Qc during disappearance of the divisional frequency signal from down counter 136b. During generation of the high level signal Qa from D-flip flop 133a, AND-gate 133d produces a high level or latch signal L (see FIG. 3) in response to the high level signal from the output terminal $Q_3$ of decade counter 133b under control of the inverter 133c related to disappearance of a subsidiary set signal $m_c$ (see FIG. 5) which should issue from control signal generator 140, as described below. The latch signal L from AND-gate 133d disappears in response to the subsidiary set signal $m_c$ from control signal generator 140. This means that disappearance of the latch signal L is maintained after generation of the subsidiary set signal $m_c$.

The frequency divider 130B comprises a binary counter 134b which is connected to the decade counter 133b of signal generator 130A and also connected through an AND-gate 134a to the wave shaper 120 and NOR-gate 133. When reset in response to the reset signal R from decade counter 133b, the binary counter 134b receives a series of the rectangular pulse signals a through AND-gate 134a from wave shaper 120 during generation of the gate signal G from NOR-gate 133 to count the same signals a in such a manner to produce a binary coded signal indicative of the counted number of the pulse signals a at its output terminals $Q_1$ to $Q_4$. A latch 135 is connected between the binary and down counters 134b, 136b and also connected to AND-gate 133d of signal generator 130A to latch therein the binary coded signal from binary counter 134b in response to the latch signal L from AND-gate 133d. In other words, the latched binary coded signal within the latch 135 responsive to the latch signal L immediately before generation of the subsidiary set signal $m_c$ is held in the latch 135 continuously after generation of the subsidiary set signal $m_c$.

The programmable down counter 136b is of CD 40102 type manufactured by RCA and is previously programmed to divide frequency of each of the pulse signals a from wave shaper 120 into a divisional frequency ratio of $1/(X-1)$, the reference character X indicating a value of the binary coded signal from latch 135. When the down counter 136b presets the binary coded signal from latch 135 at its jam-in terminals $J_0$ to $J_3$, it starts to count down the value X of the preset binary coded signal in response to a series of the pulse signals a through the inverter 136a from wave shaper 120 so as to produce a high level signal at its carry-out terminal $C_0$. Upon completing the count-down operation, the down counter 136b serves to produce a low level signal as the above-noted divisional frequency signal at its carry-out terminal $C_0$. This means that the divisional frequency signal from the carry-out terminal $C_0$ of down counter 136b has a frequency equal to $1/(X-1)$ of the frequency of each of the pulse signals a. In this case, the divisional frequency ratio of $1/(X-1)$ after generation of the subsidiary set signal $m_c$ is defined by the value of the latched binary coded signal in latch 135 immediately before generation of the subsidiary set signal $m_c$.

An inverter 137 is connected to the down counter 136b to invert the divisional frequency signal from down counter 136b into a gate signal $b_i$ shown in FIG. 3. In other words, the gate signal $b_i$ has a period $T_i$ of time which is defined by the frequency of the divisional frequency signal from down counter 136b to be maintained substantially in a constant value due to $1/(X-1)$ over a wider range of the vehicle travelling speed. A decade counter 138 is of CD 4017 type which is manufactured by RCA. When reset in response to the divisional frequency signal from down counter 136b, the decade counter 138 serves to count a series of the clock signals $C_1$ from clock circuit 110 in such a manner to produce latch and preset signals $d_i$ and $e_i$ respectively at its output terminals $Q_1$ and $Q_3$, to produce reset signals $f_i$ and $g_i$ respectively at its output terminals $Q_5$ and $Q_7$ and to produce an inhibiting signal $h_i$ at its output terminal $Q_9$ (see FIG. 3). In other words, these signals $d_i$, $e_i$, $f_i$, $g_i$ and $h_i$ are sequentially produced from the decade counter 138 during generation of the gate signal $b_i$. In addition, the inhibiting signal $h_i$ is used to inhibit the count operation of decade counter 138.

In summary, when the number of the pulse signals a defined by a width of the gate signal G immediately before generation of the subsidiary set signal $m_c$ is expressed as X, the timing signal generator 130 serves to divide the frequency of each of the pulse signals a after generation of the subsidiary set signal $m_c$ by a divisional frequency ratio of $1/(1-X)$ and produces gate, latch, preset and reset signals $b_i$, $d_i$, $e_i$, $f_i$ and $g_i$ (i=1, 2, 3, ...) respectively with the divided frequency equal to $1/(1-X)$ of the frequency of each of the pulse signals a. In this case, because the number X takes a larger (or smaller) value in dependence upon the higher (or lower) frequency of each of the pulse signals a immediately before generation of the subsidiary set signal $m_c$, the frequency or period $T_i$ of time of gate signal $b_i$ is maintained substantially in a constant value due to $1/(X-1)$ in spite of various changes of the vehicle speed.

As shown in FIG. 4, the control signal generator 140 is provided with a wave shaper 141a for reshaping the electric signal from set switch 40 into a set signal c (see FIG. 5), with a wave shaper 146a for reshaping the electric signal from acceleration switch 60 into a reshaped signal and also with wave shapers 145a and 148a for reshaping the release and resume signals h and p from cancel and resume switches 50 and 70 into reshaped signals respectively. The control signal generator 140 is further provided with an RS-flip flop 141 for generating a high level signal i (see FIG. 5) at its output terminal Q under control of a NAND-gate 141b responsive to the set signal c from wave shaper 141a. The high level signal i is also generated from RS-flip flop 141 under control of NAND-gate 141b and an OR-gate 146c responsive to the reshaped signal from wave shaper 146a or an operation signal $m_a$ (see FIG. 5) which will be produced from an RS-flip flop 149, as described later. The high level signal i from RS-flip flop 141 disappears under control of an OR-gate 141c responsive to the reset signal $f_i$ from timing signal generator 130 or a reset signal from a power-on reset circuit 144. The power-on reset circuit 144 includes a time-constant circuit 144a which is responsive to a DC voltage $V_B$ from a vehicle battery to produce a high level signal with a width defined by a predetermined time-constant of circuit 144a. The reset circuit 144 also includes a NAND-gate 144b wherein the high level signal from time-constant circuit 144a is waveformed by schmidt-trigger function of NAND-gate 144b into the reset signal described above.

In the control signal generator 140, D-flip flops 142a, 142b, 142c are provided respectively to be reset in response to the reset signal from power-on reset circuit 144. D-flip flop 142a is responsive to the high level and preset signals i and $e_i$ respectively from RS-flip flop 141 and timing signal generator 130 after its reset condition to produce a command-speed set signal j (see FIG. 5) at its output terminal Q. The command-speed set signal j from D-flip flop 142a disappears in response to the preset signal $e_i$ from timing signal generator 130 after disappearance of the high level signal i from RS-flip flop 141. After reset by the reset signal from reset circuit 144, D-flip flop 142b is responsive to the command-speed set and latch signals j and $d_i$ respectively from D-flip flop 142a and timing signal generator 130 to produce a high level signal k (see FIG. 5) at its output terminal Q. The high level signal k from D-flip flop 142b drops to a low level in response to the latch signal $d_i$ from timing signal generator 130 after disappearance of the command-speed set signal j. D-flip flop 142c produces a high level signal upon receiving the high level and latch signals k and $d_i$ respectively from D-flip flop 142b and timing signal generator 130 after its reset condition. The high level signal from D-flip flop 142c drops to a low level in response to the latch signal $d_i$ from timing signal generator 130 after disappearance of the high level signal k.

An RS-flip flop 147b is provided to produce a high level signal at its output terminal Q upon receipt of the command-speed set signal j from D-flip flop 142a after reset by an OR-gate 147a responsive to the reset signal from reset circuit 144. The high level signal from RS-flip flop 147b disappears under control of OR-gate 147a responsive to a release signal $s_1$ which will be produced from a cancellation circuit 150 (see FIGS. 1 and 6), as described later. An AND-gate 148 receives the high level signal from RS-flip flop 147b under control of an inverter 148b responsive to the reshaped signal from wave shaper 148a to produce a high level signal. The high level signal from AND-gate 148 disappears in response to disappearance of one of the reshaped and high level signals from wave shaper 148a and RS-flip flop 147b. After set by an OR-gate 149b responsive to the reset signal from reset circuit 144, an RS-flip flop 149 is reset by an OR-gate 149a responsive to the command-speed set signal j from D-flip flop 142a or the high level signal from AND-gate 148 to produce a low level signal at its output terminal Q as the operation signal $m_a$ described above. The operation signal $m_a$ from RS-flip flop 149 disappears under control of OR-gates 149b, 145b responsive to one of the reshaped signal from wave shaper 145a and a release signal $s_2$ which will be issued from the cancellation circuit 150, as described later. An RS-flip flop 143 is responsive to the command-speed set signal j from D-flip flop 142a to inhibit generation of an operation signal $m_b$ at its output terminal Q (see FIG. 5). Upon receipt of the high level signal from D-flip flop 142c, RS-flip flop 143 acts to generate a high level signal as the operation signal $m_b$. An inverter 146b serves to invert the reshaped signal from wave shaper 146a into an acceleration signal n. Furthermore, an AND-gate 147 is provided to generate a high level signal as the above-noted subsidiary set signal $m_c$ under control of an inverter 147c responsive to disappearance of the high level signal i from RS-flip flop 141 during generation of the high level signal from RS-flip flop 147b.

In summary, the control signal generator 140 is responsive to the electric signal from set switch 40 to generate a set signal c and responsive to the preset signal $e_i$ from timing signal generatot 130 after generation of the set signal c to produce a command-speed set signal j. The command-speed set signal j disappears in response to the preset signal $e_i$ from timing signal generator 130 immediately after generation of the set signal j. The control signal generator 140 is responsive to one of the command-speed set signal j and the resume signal p from resume switch 70 to produce an operation signal $m_a$ which disappears in response to one of the release signal h from cancel switch 50 and the release signal $s_2$ from cancellation circuit 150. The control signal generator 140 is responsive to the electric signal from acceleration switch 60 to produce an acceleration signal n and generates an operation signal $m_b$ in response to the latch signal $d_i$ from timing signal generator 130 immediately after disappearance of the command-speed set signal j. The control signal generator 140 is also responsive to the command-speed set signal j and the reset signal $f_i$ to produce a subsidiary set signal $m_c$ which disappears in response to one of the electric signal from acceleration switch 60 and the release signal $s_1$ from cancellation circuit 150.

Figure 6:
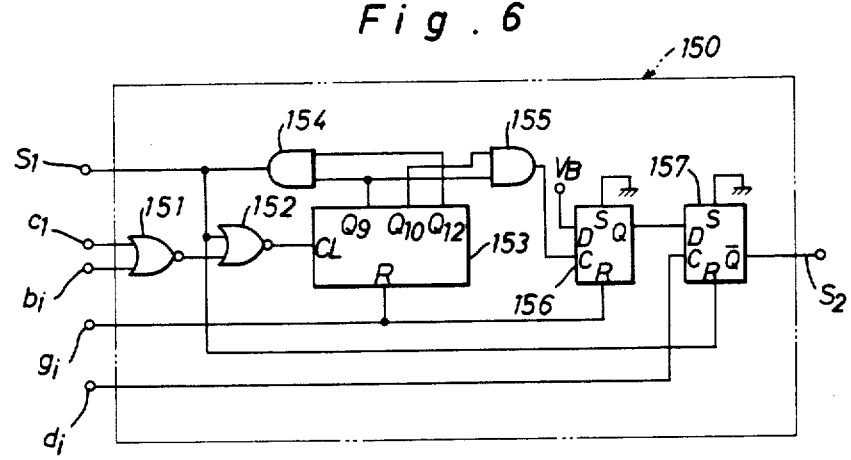
FIG. 6 is a circuit diagram of the cancellation circuit shown in block form in FIG. 1.

The cancellation circuit 150 is provided with a binary counter 153 connected through NOR-gates 151, 152 to the clock circuit 110 and timing signal generator 130, as shown in FIGS. 1, 6 and also with an AND-gate 154 connected to the binary counter 153. The binary counter 153 is of CD 4020 type manufactured by RCA and reset by the reset signal $g_i$ from timing signal generator 130 to count a series of the clock signals $C_1$ issued through NOR-gates 151, 152 from timing signal generator 130 substantially within the period of time Ti of gate signal $b_i$ during disappearance of the release signal $s_1$ from AND-gate 154. Then, the counter 153 acts to produce high level signals respectively at its output terminals $Q_9$, $Q_{10}$ and $Q_{12}$ in dependence upon the counted number of the clock signals $C_1$. In case the counted number of the clock signals $C_1$ is under 768, the counter 153 produces a high level signal at its output terminal $Q_9$ and also produces low level signals respectively at its output terminals $Q_{10}$, $Q_{12}$. In case the counted number of the clock signals $C_1$ is not less than 768 and under 2304, the counter 153 produces high level signals respectively at its output terminals $Q_9$, $Q_{10}$ and also produces a low level signal at its output terminal $Q_{12}$. In case the counted number of the clock signals $C_1$ is not less than 2304, the counter 153 produces high level signals respectively at its output terminals $Q_9$, $Q_{12}$ and also produces a low level signal at its output terminal $Q_{10}$. In the embodiment, the number of under 768 corresponds to the vehicle speed of more than 120 Km/h, and the number of not less than 2304 corresponds to the vehicle speed of under 40 Km/h.

AND-gate 154 is responsive to the high level signals from the output terminals $Q_9$, $Q_{12}$ of counter 153 to generate a high level signal as the above-noted release signal $s_1$ and ceases generation of the release signal $s_1$ when one of the high level signals from the output terminals $Q_9$, $Q_{12}$ of counter 153 disappears. This means that the release signal $s_1$ from AND-gate 154 appears at the vehicle speed of less than 40 Km/h and disappears at the vehicle speed of more than 40 Km/h. A D-flip flop 156 acts to produce a low level signal at its output terminal Q in response to the reset signal $g_i$ from timing signal generator 130 and also produces a high level signal therefrom under control of AND-gate 155 responsive to the high level signals from the output terminals $Q_9$, $Q_{10}$ of counter 153. A D-flip flop 157 is responsive to the release signal $s_1$ from AND-gate 154 to produce a high level signal at its output terminal $\overline{Q}$ as the release signal $s_2$ described above. The release signal $s_2$ also appears from D-flip flop 157 in response to the low level signal from D-flip flop 156 and the latch signal $d_i$ from timing signal generator 130. The release signal $s_2$ from D-flip flop 157 disappears in response to the latch signal $d_i$ and the high level signal from D-flip flop 156. This means that the release signal $s_2$ appears from D-flip flop 157 at the vehicle speed of under 40 Km/h or more than 120 Km/h and disappears at the vehicle speed of more than 40 Km/h and under 120 Km/h.

From the above description, it will be understood that the cancellation circuit 150 is controlled by the clock circuit 110 and timing signal generator 130 to produce a release signal $s_1$ at the vehicle speed of under 40 Km/h and also to produce a release signal $s_2$ at the vehicle speed of under 40 Km/h or more than 120 Km/h.

Figure 7:
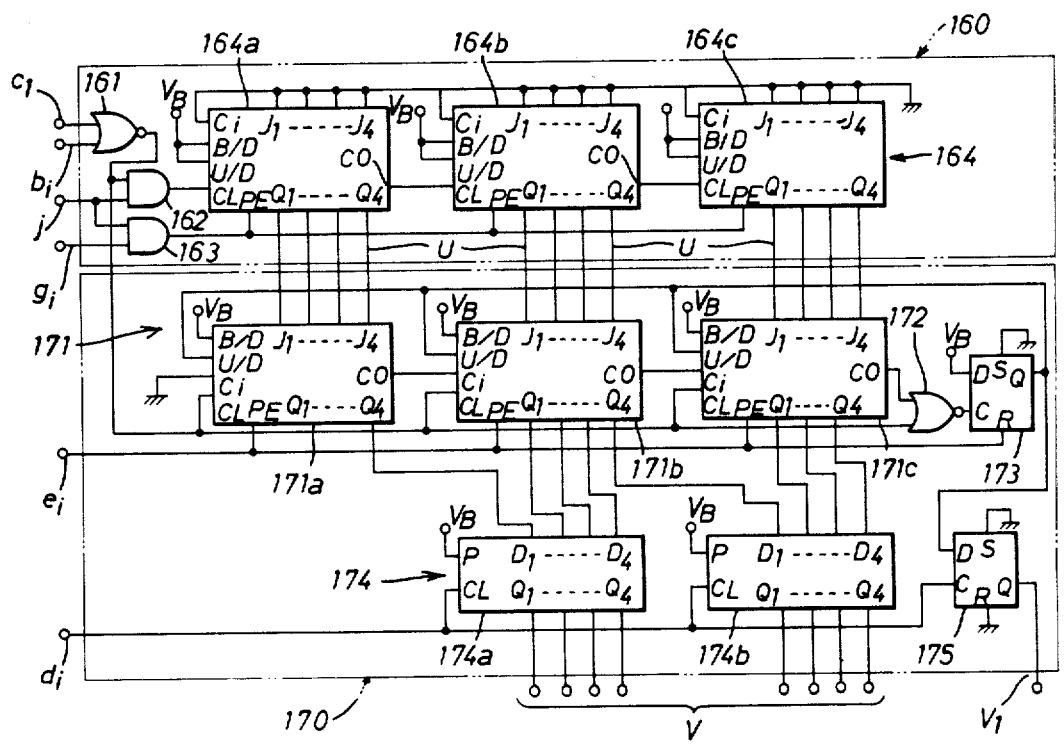
FIG. 7 is circuit diagrams of the command-speed set circuit and speed-difference calculation circuit respectively shown in block form in FIG. 1.

The electronic control circuit EC includes a command-speed set circuit 160 connected to the clock circuit 110, timing signal generator 130 and control signal generator 140, and a speed-difference calculation circuit 170 connected to the timing signal generator 130 and command-speed set circuit 160, as shown in FIGS. 1, 7.

The command-speed set circuit 160 includes an up counter circuit 164 which is controlled by a NOR-gate 161 and AND-gates 162, 163. The up counter circuit 164 is formed by presettable up-down counters 164a, 164b, 164c to function as a twelve-bit up counter circuit, as shown in FIG. 7. Each of the up-down counters 164a to 164c is of CD 4029 type which is manufactured by RCA. The up counter circuit 164 is reset by AND-gate 163 responsive to the reset and command-speed set signals $g_i$ and j respectively from timing and control signal generators 130 and 140 to count up a series of clock signals $C_1$ issued through NOR-gate 161 and AND-gate 162 from clock circuit 110 within the period Ti of time of gate signal $b_i$ during generation of the command-speed set signal j. Upon completing the count up operation, the up counter circuit 164 acts to memorize therein the counted resultant value as a binary coded signal u indicative of the period Ti of time of gate signal $b_i$. This means that the binary coded signal u is defined by the desired or command-speed of the vehicle upon closure of set switch 40. Additionally, the count up operation of up counter circuit 164 is stopped by AND-gate 162 responsive to disappearance of the command-speed set signal j.

The speed-difference calculation circuit 170 includes a counter circuit 171 which is formed by presettable up-down counters 171a, 171b, 171c to function as a twelve-bit up-down counter circuit, as shown in FIG. 7. Each of the up-down counters 171a, 171b, 171c is of CD 4029 type which is manufactured by RCA. The counter circuit 171 presets therein the binary coded signal u from up counter circuit 164 in response to the preset signal $e_i$ from timing signal generator 130 to count down the value of the same signal u in accordance with a series of the clock signals $C_1$ issued through NOR-gate 161 from clock circuit 110 within the period Ti of time of gate signal $b_i$ during generation of a low level signal which will be issued from a D-flip flop 173, as described below. During this count down operation, the counter circuit 171 serves to produce a high level signal at a carry-out terminal CO of up-down counter 171c.

In case the value of binary coded signal u is larger than a total period of time of a series of the clock signals $C_1$ issued through NOR-gate 161 from clock circuit 110 within the period Ti of time of gate signal $b_i$, the counter circuit 171 completes the count down operation thereof during generation of the low level signal from D-flip flop 173 to produce an eight-bit binary coded signal indicating an absolute value of a time difference between the value of binary coded signal u and the total period of time of the above-noted clock signals $C_1$ through NOR-gate 161, the time difference having a positive sign defined by the low level signal from D-flip flop 173. In case the value of binary coded signal u is smaller than the total period of time of a series of the above-noted clock signals through NOR-gate 161, the counter circuit 171 drops the high level signal from the carry-out terminal CO of counter 171c to a low level upon completion of the count down operation thereof and counts up the remainder of the above-noted clock signals $C_1$ through NOR-gate 161 in response to a high level signal which will be issued from D-flip flop 173. Upon completeing the count up operation, the counter circuit 171 serves to produce a binary coded signal indicating an absolute value of another time difference between the value of binary coded signal u and the total period of time of the above-noted clock signals through NOR-gate 161, another time difference having a negative sign defined by the high level signal from D-flip flop 173.

D-flip flop 173 is reset in response to the preset signal $e_i$ from timing signal generator 130 to produce the above-noted low level signal at its output terminal Q. D-flip flop 173 also serves to produce the above-noted high level signal at its output terminal Q upon receiving the DC voltage $V_B$ from the vehicle battery under control of a NOR-gate 172 responsive to drop of one of the above-noted clock signals $C_1$ through NOR-gate 161 to a low level immediately after generation of the low level signal from the carry-out terminal CO of counter 171c. A latch circuit 174 is composed of a pair of latches 174a, 174b and is responsive to the latch signal $d_i$ from timing signal generator 130 to latch therein the binary coded signal from up-down counter circuit 171 so as to produce the same signal as an eight-bit difference signal v. A D-flip flop 175 acts to produce a low level signal at its output terminal Q in response to the latch signal $d_i$ and the low level signal from D-flip flop 173. D-flip flop 175 also produces a high level signal in response to the latch signal $d_i$ and the high level signal from D-flip flop 173. In other words, the high level signal from D-flip flop 173 is produced from D-flip flop 175 as a sign signal $v_1$ with the high level or negative sign in response to the latch signal $d_i$, and the low level signal from D-flip flop 173 is also produced from D-flip flop 175 as a sign signal $v_1$ with the low level or positive sign in response to the latch signal $d_i$.

In summary, it will be understood that the speed-difference calculation circuit 170 is responsive to the preset signal $e_i$ from timing signal generator 130 to calculate a time difference between the value of the binary coded signal u from command-speed set circuit 160 and a total period of time of a series of the clock signals $C_1$ issued from clock circuit 110 within the period Ti of time of gate signal $b_i$ and also responsive to the latch signal $d_i$ from timing signal generator 130 to produce a difference signal v indicative of the calculated time difference and a sign signal $v_1$ indicative of a positive or negative sign of the calculated time difference.

From the above description, it will be clearly recognized that a vehicle speed $V_s$ satisfies the following equation (1) in relation to the period Ti of time of gate signal $b_i$ from timing signal generator 130.

$$Ti = \beta/V_s \qquad (1)$$

where the character $\beta$ indicates a constant. Assuming that the vehicle command-speed upon closure of the set switch 40 is $V_{so}$ and that the actual vehicle speed is $(V_{so} - \Delta V_s)$, a time difference $\Delta T$ is represented by the following equation (2).

$$T = \beta \left( \frac{1}{V_{so} - \Delta V_s} - \frac{1}{V_{so}} \right) \qquad (2)$$

$$= \frac{\beta \Delta V_s}{(V_{so} - \Delta V_s) V_{so}}$$

$$\approx \frac{\beta \Delta V_s}{V_{so}^2} \quad (\because V_{so}^2 >> \Delta V_s V_{so})$$

where the character $\Delta v_s$ indicates a difference between the vehicle command-speed $V_{so}$ and the actual vehicle speed. This means that the time difference $\Delta T$ is substantially proportional to the speed difference $\Delta V_s$.

Consequently, it should be understood that the difference signal v from latch circuit 174 indicates the time difference $\Delta T$ corresponding with the speed difference $\Delta V_s$.

Figure 8:
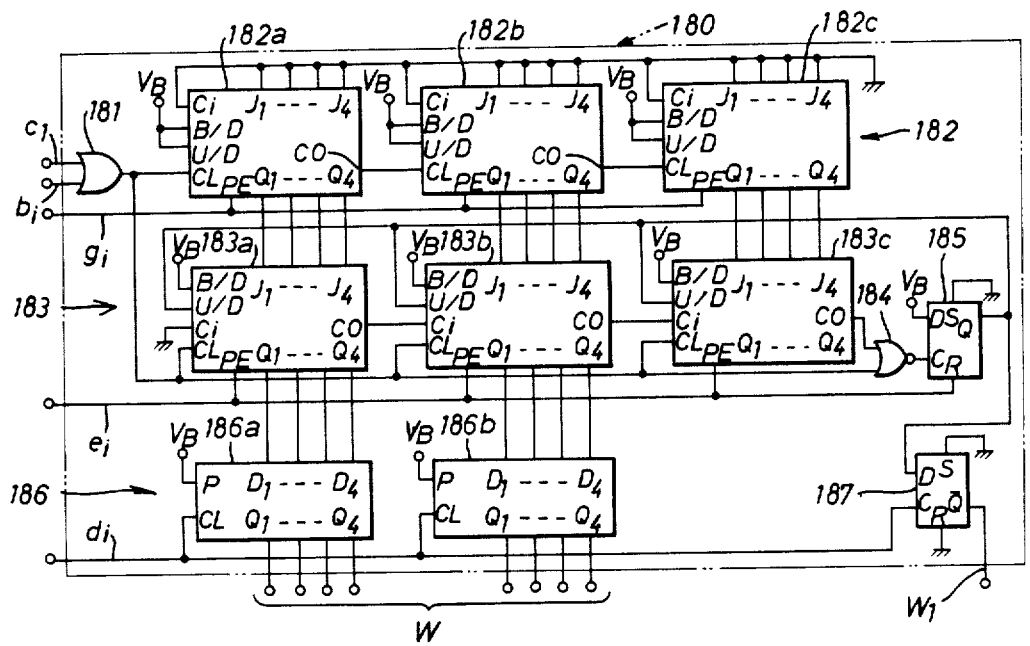
FIG. 8 is a circuit diagram of the acceleration calculation circuit shown in block form in FIG. 1.

The electronic control circuit EC includes an acceleration calculation circuit 180 connected to the clock circuit 110 and timing signal generator 130, and a correction signal generator 190 connected to the clock circuit 110, timing and control signal generators 130 and 140 and calculation circuits 170, 180, as shown in FIG. 1. The acceleration calculation circuit 180 comprises a counter circuit 182 which is formed by presettable up-down counters $182_a$, 182b, 182c to function as a twelve-bit up counter circuit, as shown in FIG. 8. Each of the up-down counters 182a, 182b, 182c is of CD 4029 type which is manufactured by RCA. The counter circuit 182 is reset in response to the reset signal $g_i$ from timing signal generator 130 to count up a series of the clock signals $C_1$ issued through an OR-gate 181 from clock circuit 110 within the period Ti of time of gate signal $b_i$. Upon completion of the count up operation, the counter circuit 182 acts to latch therein the counted resultant value as a binary coded signal indicative of the period Ti of time of gate signal $b_i$ to be applied to a counter circuit 183.

The counter circuit 183 is formed by presettable up-down counters 183a, 183b, 183c to function as a twelve-bit up-down counter circuit, as shown in FIG. 8. Each of the up-down counters 183a, 183b, 183c is of CD 4029 type which is manufactured by RCA. The counter circuit 183 presets therein the binary coded signal from counter circuit 182 in response to the preset signal $e_i$ from timing signal generator 130 to count down the value of the same signal in accordance with a series of the clock signals $C_1$ from OR-gate 181 during generation of a low level signal which will be issued from D-flip flop 185, as described later. During the count down operation, the counter circuit 183 acts to produce a high level signal at a carry-out terminal CO of counter 183c. In case the value of binary coded signal from counter circuit 182 is larger than a total period of time of a series of the clock signals $C_1$ issued from OR-gate 181 within the period Ti of time of gate signal $b_i$, the counter circuit 183 completes the count down operation thereof during generation of the low level signal from D-flip flop 185 to produce an eight-bit binary coded signal indicating an absolute value of a time difference between the value of binary coded signal from counter circuit 182 and the total period of time of the above-noted clock signals $C_1$ from OR-gate 181, the time difference having a positive sign defined by the low level signal from D-flip flop 185. In case the value of binary coded signal from counter circuit 182 is smaller than the total period of time of the above-noted clock signals $C_1$ from OR-gate 181, the counter circuit 183 drops the high level signal from the carry-out terminal CO of counter 183c to a low level upon completion of the count down operation thereof and counts up the remainder of a series of the above-noted clock signals $C_1$ in response to a high level signal which will be issued from D-flip flop 185. Upon completing the count up operation, the counter circuit 183 serves to produce an eight-bit binary coded signal indicating an absolute value of another time difference between the value of binary coded signal from counter circuit 182 and the total period of time of the above-noted clock signals $C_1$ from OR-gate 181, another time difference having a negative sign defined by the high level signal from D-flip flop 185.

D-flip flop 185 is reset in response to the preset signal $e_i$ from timing signal generator 130 to produce the above-noted low level signal at its output terminal Q. D-flip flop 185 also produces the above-noted high level signal at its output terminal Q upon receiving the DC voltage $V_B$ from the vehicle battery under control of a NOR-gate 184 responsive to drop of one of a series of the clock signals $C_1$ from OR-gate 181 immediately after generation of the low level signal from the carry-out terminal CO of counter 183c. A latch circuit 186 is composed of a pair of latches 186a, 186b and is responsive to the latch signal $d_i$ from timing signal generator 130 to latch therein the binary coded signal from counter circuit 183 so as to produce the same signal as an eight-bit difference signal w. A D-flip flop 187 acts to produce a high level signal at its output terminal $\overline{Q}$ in response to the latch signal $d_i$ and the low level signal from D-flip flop 185. D-flip flop 187 also produces a low level signal in response to the latch signal $d_i$ and the high level signal from D-flip flop 185. In other words, the high level signal from D-flip flop 185 is produced from D-flip flop 187 as a sign signal $w_1$ with the low level or negative sign in response to the latch signal $d_i$, and the low level signal from D-flip flop 185 is produced from D-flip flop 187 as a sign signal $w_1$ with the high level or positive sign in response to the latch signal $d_i$.

From the above description, it will be understood that the acceleration calculation circuit 180 is responsive to the reset and preset signals $g_i$ and $e_i$ from timing signal generator 130 to calculate a time difference between a total period of time of a series of the clock signal $C_1$ defined by the period Ti of time of gate signal $b_i$ and another total period of time of a series of the clock signals $C_1$ defined by a period $T_{i+1}$ of time of a gate signal $b_{i+1}$ following the above gate signal $b_i$ so as to produce a difference signal w indicative of an absolute value of the calculated time difference and a sign signal $w_1$ indicative of the positive or negative sign of the calculated time difference.

Figure 9:
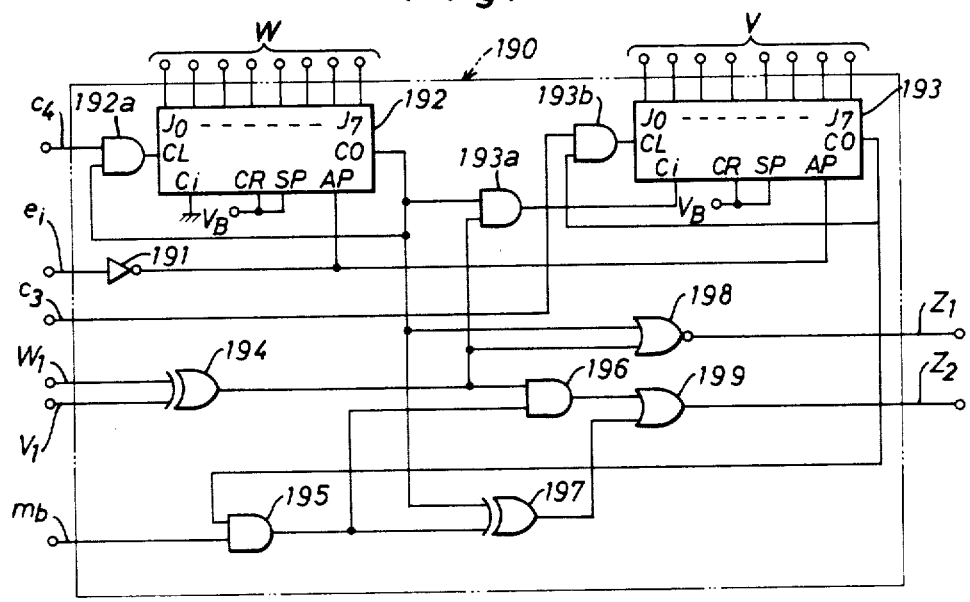
FIG. 9 is a circuit diagram of the correction signal generator shown in block form in FIG. 1.

As shown in FIG. 9, the correction signal generator 190 includes a pair of presettable down counters 192, 193 each of which is of CD 40103 type manufactured by RCA. The down counter 192 receives the difference signal w from acceleration calculation circuit 180 at its jam-in terminals $J_0$ to $J_7$ to preset therein the same signal w upon receiving the preset signal $e_i$ through an inverter 191 from timing signal generator 130 at its asynchronous preset-enable terminal AP. Then, the counter 192 serves to generate a high level signal at its carry-out terminal CO such that it starts to count down a value of the difference signal w in accordance with a series of the clock signals $C_4$ through an AND-gate 192a from clock circuit 110. Upon counting the value of difference signal w down to zero, the high level signal from the carry-out terminal CO of counter 192 drops to a low level to inhibit the count operation of counter 192 under control of AND-gate 192a. The above-noted operation in counter 192 is repeated in response to each preset signal $e_i$ from timing signal generator 130 such that a high level signal with a width corresponding to the value of difference signal w is repetitively produced from the carry-out terminal CO of counter 192. Additionally, the counter 192 is also provided with clear and synchronous preset-enable terminals CR and SP respectively for receiving the DC voltage $V_B$ from the vehicle battery.

The down counter 193 receives the difference signal v from speed-difference calculation circuit 170 at its jam-in terminals $J_0$ to $J_7$ to preset therein the same signal v upon receiving the preset signal $e_i$ through the inverter 191 from timing signal generator 130 at its synchronous preset-enable terminal AP. When the counter 193 receives a high level signal from an AND-gate 193a at its carry-in terminal $c_i$, it is inhibited in its count down operation to produce a high level signal at its carry-out terminal CO. The high level signal from AND-gate 193a appears in response to the high level signal from down counter 192 and a high level signal which issues from an exclusive OR-gate 194 based on the identical signs or opposite levels of the sign signals $v_1$, $w_1$ respectively from calculation circuits 170, 180. Conversely, the high level signal from AND-gate 193a disappears in response to one of the low level signal from down counter 192 and a low level signal issuing from exclusive OR-gate 194 based on the opposite signs or identical levels of the sign signals $v_1$, $w_1$. Upon disappearance of the high level signal from AND-gate 193a, the counter 193 maintains generation of the high level signal therefrom and starts to count down a value of the difference signal v in accordance with a series of the clock signals $C_3$ through an AND-gate 193b from clock circuit 110. The count down operation of counter 193 is also initiated upon preset of the difference signal v into the counter 193 during disappearance of the high level signal from AND-gate 193a. Upon counting the value of difference signal v down to zero, the high level signal from the counter 193 drops to a low level to inhibit the count down operation of counter 193 under control of AND-gate 193b. The above-noted operation in counter 193 is repeated in response to each preset signal $e_i$ from timing signal generator 130 such that a high level signal with a width corresponding to the value of difference signal v or to a total of the values of difference signals v, w is repetitively produced from the carry-out terminal CO of counter 193.

The control signal generator 190 also includes a NOR-gate 198 for generating a first correction signal $z_1$ with a low level in response to the high level signal from down counter 192 during generation of the low level signal from exclusive OR-gate 194. The first correction signal $z_1$ with low level also appears during generation of the high level signal from exclusive OR-gate 194 regardless of operation of down counter 192. Upon appearance of each of the low level signals respectively from down counter 192 and exclusive OR-gate 194, the first correction signal $z_1$ from NOR-gate 198 rises to a high level. This means that the first correction signal $z_1$ with low level has a width corresponding to the value of difference signal w.

An AND-gate 195 is provided to produce a high level signal in response to the high level signal from down counter 193 during generation of the operation signal $m_b$ from control signal generator 140. The high level signal from AND-gate 195 drops to a low level when one of the operation signal $m_b$ and the high level signal from counter 193 drops to a low level. An AND-gate 196 serves to produce a high level signal in response to both of the high level signals from the exclusive OR-gate 194 and AND-gate 195. The high level signal from AND-gate 196 drops to a low level when one of the high level signals from the exclusive OR-gate 194 and AND-gate 195 drops to a low level. An exclusive OR-gate 197 acts to produce a low level signal in response to the low or high level signals from the down counter 192 and AND-gate 195. The low level signal from exclusive OR-gate 197 rises to a high level in response to the opposite level signals from the down counter 192 and AND-gate 195. An OR-gate 199 is responsive to at least one of the high level signals from the exclusive OR-gate 197 and AND-gate 196 to produce a second correction signal $z_2$ with a high level. The second correction signal $z_2$ from OR-gate 199 drops to a low level in response to the low level signals from the exclusive OR-gate 197 and AND-gate 196.

In other words, while the operation signal $m_b$ from control signal generator 140 disappears, the second correction signal $z_2$ with high level appears from OR-gate 199 during the count down operation of counter 192 and drops to a low level upon completion of the count down operation of counter 192. This means that the second correction signal $z_2$ with high level has a width corresponding to the value of difference signal w regardless of function of the exclusive OR-gate 194. While appearance of the operation signal $m_b$ from control signal generator 140 at the identical level of the sign signals $v_1$, $w_1$, the correction signal $z_2$ remains at a low level during the count down operation of each of counters 192, 193 and rises to a high level upon completion of the count down operation in one of counters 192, 193. This means that the correction signal $z_2$ has a width corresponding to an absolute value $|w-v|$ of a difference between each value of difference signals v, w. While appearance of the operation signal $m_b$ at the opposite levels of the sign signals $v_1$, $w_1$, the correction signal $z_2$ with high level appears during the count down operation of counter 192 and also appears during the count down operation of counter 193 caused by completion of the count down operation of counter 192, the correction signal $z_2$ dropping to a low level upon completion of the count down operation of counter 193. This means that the correction signal $z_2$ has a width corresponding to an absolute value $|v+w|$ of a total value of difference signals v, w.

Figure 10:
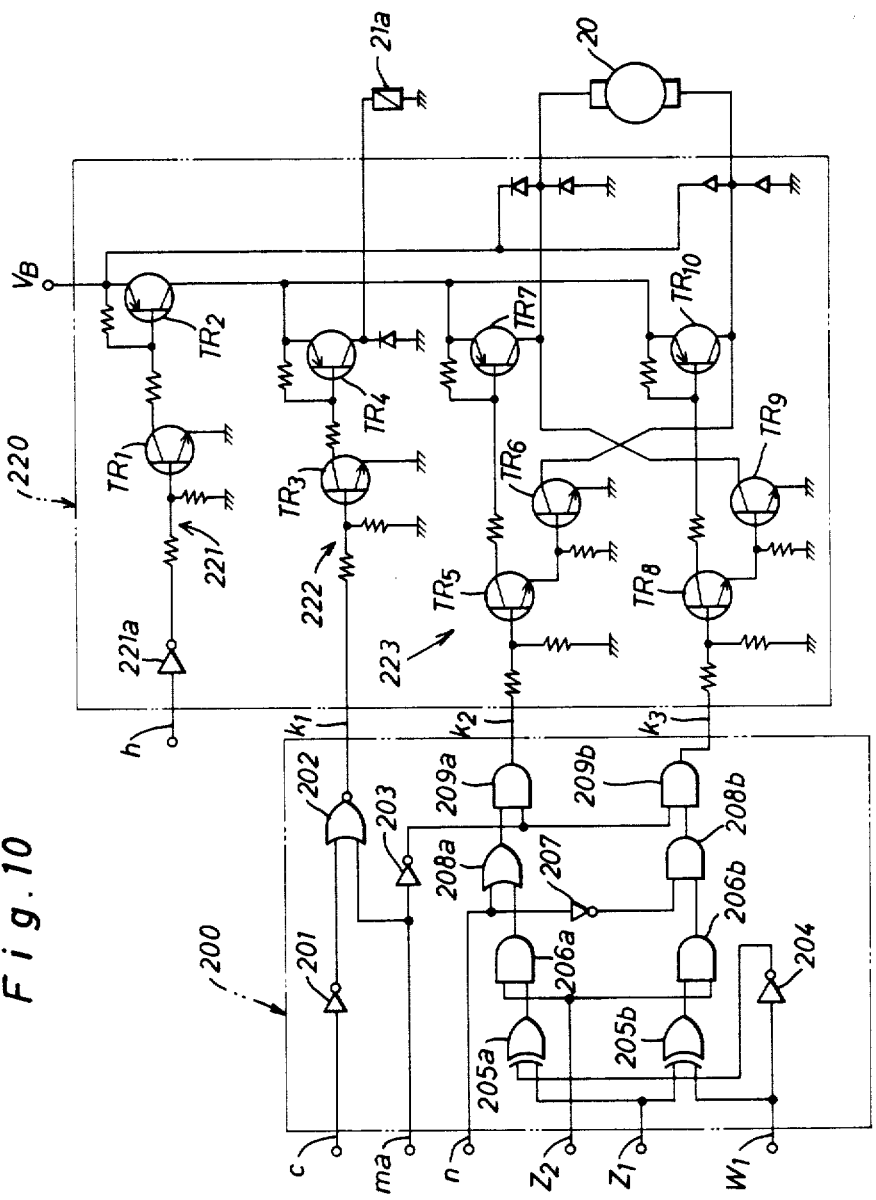
FIG. 10 is circuit diagrams of the distribution and drive circuits respectively shown in block form in FIG. 1.

In the electronic control circuit EC, a distribution circuit 200 is connected to the control signal generator 140, acceleration calculation circuit 180 and correction signal generator 190, as shown in FIGS. 1, 10. The distribution circuit 200 comprises a NOR-gate 202 for generating a first distribution signal $k_1$ under control of an inverter 201 responsive to disappearance of the set signal c from the wave shaper 141a of control signal generator 140 (see FIG. 4) during generation of the operation signal $m_a$ from control signal generator 140, as shown in FIG. 10. The first distribution signal $k_1$ from NOR-gate 202 disappears in response to appearance of the set signal c or disappearance of the operation signal $m_a$. An exclusive OR-gate 205a is provided to generate a low level signal upon receipt of the first correction signal $z_1$ from correction signal generator 190 under control of an inverter 204 responsive to the sign signal $w_1$ with the level opposite to that of the first correction signal $z_1$. The exclusive OR-gate 205a also generates a high level signal upon receipt of the first correction signal $z_1$ under control of the inverter 204 responsive to the sign signal $w_1$ with the level indentical to that of the first correction signal $z_1$.

An AND-gate 209a is provided to generate a second distribution signal $k_2$ upon receiving the acceleration signal n through an OR-gate 208a from control signal generator 140 under control of an inverter 203 based on the operation signal $m_a$. Generation of the second distribution signal $k_2$ from AND-gate 209a is also conducted under control of OR-gate 208a and an AND-gate 206a responsive to both the high level signal from exclusive OR-gate 205a and the second correction signal $z_2$ with high level from correction signal generator 190 under control of inverter 203 based on the operation signal $m_a$. The second distribution signal $k_2$ from AND-gate 209a disappears under control of inverter 203 responsive to disappearance of the operation signal $m_a$ and also disappears under control of OR-gate 208a and AND-gate 206a responsive to one of the low level signal from exclusive OR-gate 205a and the second correction signal $z_2$ with low level from correction signal generator 190 during disappearance of the acceleration signal n.

An exclusive OR-gate 205b is provided to produce a low level signal upon receipt of the sign signal $w_1$ from acceleration calculation circuit 180 and the first correction signal $z_1$ with the identical level to that of the sign signal $w_1$. The exclusive OR-gate 205b also produces a high level signal upon receipt of the sign signal $w_1$ and the first correction signal $z_1$ with the opposite level to that of the sign signal $w_1$. An AND-gate 209b is provided to generate a third distribution signal $k_3$ under control of inverters 203, 207 respectively based on the operation signal $m_a$ and disappearance of the acceleration signal n and control of AND-gates 208b, 206b responsive to both the second correction signal $z_2$ with high level and the high level signal from exclusive OR-gate 205b. The third distribution signal $k_3$ from AND-gate 209b disappears under control of inverter 203 responsive to disappearance of the operation signal $m_a$ or under control of AND-gate 208b and inverter 207 responsive to the acceleration signal n. The third distribution signal $k_3$ from AND-gate 209b also disappears under control of AND-gate 206b responsive to one of the second correction signal $z_2$ with low level and the low level signal from exclusive OR-gate 205b.

In summary, the distribution circuit 200 acts to generate a first distribution signal $k_1$ in response to the operation signal $m_a$ after disappearance of the set signal c. In case of generation of each of the operation signals $m_a$, $m_b$ during disappearance of the acceleration signal n, the distribution circuit 200 acts to generate a second distribution signal $k_2$ in relation to the low (or high) level of each of the sign and correction signals $w_1$, $z_1$ and generates a third distribution signal $k_3$ in relation to the opposite levels of the sign and correction signals $w_1$, $z_1$. In this case, each of the distribution signals $k_2$, $k_3$ has a width corresponding to a width of the second correction signal $z_2$ defined by the difference signal w. In case of generation of the operation signal $m_a$ during disappearance of each of the acceleration and operation signals n, $m_b$, the distribution circuit 200 acts to generate a second distribution signal $k_2$ in relation to the high level of sign signal $v_1$ and the low level of each of the sign and correction signals $w_1$, $z_1$ and generates a third distribution signal $k_3$ in relation to the high level of sign signal $w_1$ and the low level of each of the sign and correction signals $v_1$, $z_1$. In this case, each of the distribution signals $k_2$, $k_3$ has a width corresponding to the width of second correction signal $z_2$ defined by the absolute value $|v+w|$ of the total value of the difference signals v, w.

In case of generation of the operation signal $m_a$ during disappearance of each of the acceleration and operation signals n, $m_b$, the distribution circuit 200 serves to generate a second distribution signal $k_2$ in relation to the low level of each of the sign and correction signals $v_1$, $w_1$, $z_1$ when the value of difference signal w is larger than that of difference signal v. Generation of the second distribution signal $k_2$ is also conducted in relation to the high level of each of the sign and correction signals $v_1$, $w_1$, $z_1$ when the value of the difference signal w is smaller than that of the difference signal v. In this case, the second distribution signal $k_2$ has a width corresponding to the width of second correction signal $z_2$ defined by the absolute value $|v-w|$ of the difference value between the difference signals v, w.

In case of generation of the operation signal $m_a$ during disappearance of each of the acceleration and operation signals n, $m_b$, the distribution circuit 200 serves to generate a third distribution signal $k_3$ in relation to the high level of the correction signal $z_1$ and the low level of each of the sign signals $v_1$, $w_1$ when the value of the difference signal w is smaller than that of the difference signal v. Generation of the third distribution signal $k_3$ is also conducted in relation to the low level of the correction signal $z_1$ and the high level of each of the sign signals $v_1$, $w_1$. In this case, the third distribution signal $k_3$ has a width corresponding to the width of second correction signal $z_2$ defined by the absolute value $|v-w|$ of the difference value between the difference signals v, w. In addition, the distribution circuit 200 generates a second distribution signal $k_2$ in response to the acceleration signal n.

A drive circuit 200 is provided with a first transistor circuit 221 connected to the cancel switch 50 and with second and third transistor circuits 222, 223 connected to the distribution circuit 200, as shown in FIGS. 1, 10. The first transistor circuit 221 includes a transistor $TR_1$ which is turned on under control of an inverter 221a based on release of the cancel switch 50 such that a transistor $TR_2$ is made conductive to supply the DC voltage $V_B$ from the vehicle battery to second and third transistor circuits 222 and 223. The transistor $TR_1$ is turned off under control of inverter 221a responsive to appearance of the release signal h from cancel switch 50 such that the transistor $TR_2$ is made nonconductive to block the supply of DC voltage $V_B$ from the vehicle battery to the transistor circuits 222, 223. The second transistor circuit 222 includes a transistor $TR_3$ which is turned on in response to the first distribution signal $k_1$ from distribution circuit 200 such that a transistor $TR_4$ is made conductive to produce a first drive signal from energizing the coil 21a of clutch mechanism 21 under conduction of the transistor $TR_2$. The transistor $TR_3$ is turned off in response to disappearance of the first distribution signal $k_1$ such that the transistor $TR_4$ is made nonconductive to cease generation of the first drive signal therefrom.

The third transistor circuit 223 includes a transistor $TR_5$ which is turned on in response to the second distribution signal $k_2$ from distribution circuit 200 such that each of transistors $TR_6$, $TR_7$ is made conductive to produce a second drive signal from a collector of transistor $TR_7$ for rotating the motor 20 clockwisely. The transistor $TR_5$ is turned off in response to disappearance of the second distribution signal $k_2$ such that each of transistors $TR_6$, $TR_7$ is made nonconductive to cease generation of the second drive signal therefrom. The third transistor circuit 223 also includes a transistor $TR_8$ which is turned on in response to the third distribution signal $k_3$ from distribution circuit 200 such that each of transistor $TR_9$, $TR_{10}$ is made conductive to produce a third drive signal from a collector of transistor $TR_{10}$ for rotating the motor 20 counterclockwisely. The transistor $TR_8$ is turned off in response to disappearance of the third distribution signal $k_3$ such that each of transistors $TR_9$, $TR_{10}$ is made nonconductive to cease generation of the third drive signal therefrom. In addition, nonconduction of transistor $TR_2$ ceases generation of each of the first to third drive signals.

OPERATION

When the vehicle starts to travel on a flat road upon depression of the accelerator pedal 14 and the speed control apparatus is ready for its operation, the throttle valve 12 remains at the actual opening angle defined by the depression of accelerator pedal 14. Each of the reversible motor 20 and clutch mechanism 21 is also maintained inoperative because the drive circuit 220 may not yet produce any drive signals under control of the distribution circuit 200 based on disappearance of an operation signal $m_a$ from control signal generator 140, as understood from the above description.

At this stage, the cancellation circuit 150 is controlled by the timing signal generator 130 to repetitively produce release signals $s_1$, $s_2$ in accordance with a series of clock signals $C_1$ from clock circuit 110, and the control signal generator 140 is responsive to the release signals $s_1$, $s_2$ to maintain disappearance of each of the operation signal $m_a$ and a subsidiary set signal $m_c$ therefrom, as previously described. The acceleration calculation circuit 180 is also controlled by the timing signal generator 130 to repetitively produce difference and sign signals w and $w_1$ in accordance with a series of clock signals $C_1$ from clock circuit 110, as previously described. In the timing signal generator 130, the frequency divider 130B counts a series of pulse signals a from wave shaper 120 during generation of a gate signal G from NOR-gate 133 in response to a reset signal R from decade counter 133b to latch therein the counted resultant number of the pulse signals a as a binary coded signal in response to a latch signal L from AND-gate 133d. Then, the frequency divider 130B divides the frequency of each of the pulse signals a in relation to a value of the latched binary coded signal with the divisional frequency ratio thereof to produce a gate signal $b_i$ with a period Ti of time and also to produce latch, preset and reset signals $d_i$, $e_i$, $f_i$, and $g_i$.

Figure 5:
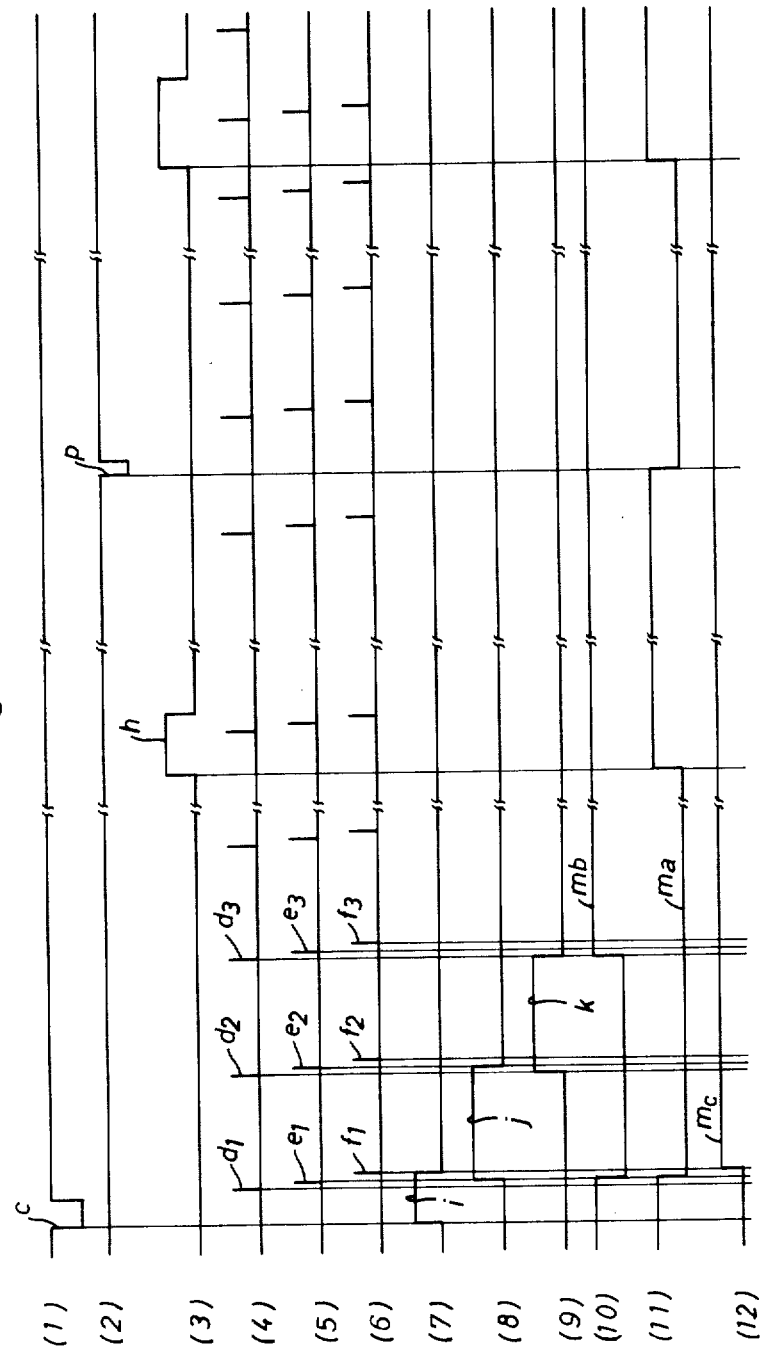
FIG. 5 illustrates waveforms obtained at various points in the control signal generator and various switches.

When the set switch 40 is temporarily closed upon reach of the actual vehicle speed to a desired or first command value after disappearance of each of the release signals $s_1$, $s_2$ due to acceleration of the vehicle, an electric signal appearing from the set switch 40 is reshaped by the wave shaper 141a of control signal generator 140 into a set signal c (see FIG. 5). When RS-flip flop 141 produces a high level signal i (see FIG. 5) under control of NAND-gate 141b responsive to the set signal c, the high level signal i is applied to D-flip flop 142a and inverter 147c. Assuming that immediately after disappearance of set signal c, the timing signal generator 130 produces a gate signal $b_1$ with a period $T_1$ of time and also produces latch and preset signals $d_1$, $e_1$ and reset signals $f_1$, $g_1$, as previously described, the latch circuit 186 of calculation circuit 180 is responsive to the latch signal $d_i$ to latch therein an absolute value of a time difference counted previously in the counter circuit 183 and to produce tha latched value as an eight-bit difference signal w, and simultaneously D-flip flop 187 acts to generate a sign signal $w_1$. In this instance, the sign signal $w_1$ has a positive sign (or a high level) because of acceleration of the vehicle.

When D-flip flop 142a of control signal generator 140 receives the preset signal $e_1$ during generation of the high level signal i from RS-flip flop 141, it produces a command-speed set signal j which is applied to D-flip flop 142b, RS-flip flops 143, 147b and OR-gate 149a and also to the command-speed set circuit 160. Then, RS-flip flop 147b is responsive to the command-speed set signal j to produce a high level signal, and simultaneously RS-flip flop 149 is controlled by OR-gate 149a to generate an operation signal $m_a$ (see FIG. 5), whereas RS-flip flop 143 serves to inhibit generation of an operation signal $m_b$ (see FIG. 5) therefrom. Then, the distribution circuit 200 is responsive to the operation signal $m_a$ from RS-flip flop 149 to produce a first distribution signal $k_1$ upon receipt of which the drive circuit 220 produces a first drive signal to energize the electromagnetic coil 21a of clutch mechanism 21. As a result, the clutch mechanism 21 is engaged due to the energization of coil 21a to connect the rack-and-pinion 22 with the motor 20.

When the counter circuit 183 of calculation circuit 180 receives the preset signal $e_1$ from timing signal generator 130, it acts to preset therein a value counted previously in the counter circuit 182 as a twelve-bit binary coded signal and starts to count down the preset value at the trailing edge of gate signal $b_1$ in accordance with a series of clock signals $C_1$ through OR-gate 181 from clock circuit 110. When the down counter 192 of correction signal generator 190 presets therein the difference signal w from calculation circuit 180 under control of the inverter 191 responsive to the preset signal $e_1$, it produces a high level signal therefrom and starts to count down a value of the preset signal w in accordance with a series of clock signals $C_4$ through AND-gate 192a from clock circuit 110. Then, NOR-gate 198 is responsive to the high level signal from down counter 192 to produce a first correction signal $z_1$ with a low level, and the exclusive OR-gate 197 receives the high level signal from counter 192 under control of AND-gate 195 related to disappearance of the operation signal $m_b$ and acts to produce a high level signal in response to which OR-gate 199 generates a second correction signal $z_2$ with a high level. When the distribution circuit 200 receives the correction signals $z_1$ and $z_2$ respectively with low and high levels, it produces a third distribution signal $k_3$ in relation to the high level of sign signal $w_1$ to generate a third drive signal from the drive cirucit 220, as previously described. Thus, the motor 20 is rotated counterclockwise upon receiving the third drive signal from drive cirucit 220 and operates the rack-and-pinion 22 during engagement of clutch mechanism 21 to decrease the actual opening angle of throttle valve 12. As a result, restraint to the actual acceleration of the vehicle is initiated due to the decrease of the throttle opening angle to control the actual vehicle speed toward the desired value.

When the high level signal i from RS-flip flop 141 of control signal generator 140 drops to a low level under control of OR-gate 141c responsive to the reset signal $f_1$ from timing signal generator 130, AND-gate 147 is controlled by the inverter 147c during generation of the high level signal from RS-flip flop 147b to produce a high level signal as the above-noted subsidiary set signal $m_c$ (see FIG. 5) upon receipt of which AND-gate 133d of timing signal generator 130 acts to inhibit generation of a latch signal L therefrom under control of the inverter 133c. Thus, a binary coded signal latched in latch 135 of timing signal generator 130 immediately before generation of the subsidiary set signal $m_c$ is maintained in the latch 135 after generation of the subsidiary set signal $m_c$ to define the divisional frequency ratio of down counter 136b of timing signal generator 130.

When the counter circuit 164 of command-speed set circuit 160 is reset by AND-gate 163 responsive to the reset signal $g_1$ from timing signal generator 130 during generation of the command-speed set signal j, it starts to count a series of clock signals $C_1$ through AND-gate 162 and NOR-gate 161 from clock circuit 110 at the trailing edge of gate signal $b_1$, and simultaneously the counter circuit 182 of calculation circuit 180 is reset and starts to count a series of clock signals $C_1$ through OR-gate 181 from clock circuit 110 at the trailing edge of gate signal $b_1$. Upon completing the above-noted count down operation, the counter 192 of correction signal generator 190 drops the high level signal therefrom to a low level, and the correction signal $z_2$ from OR-gate 199 also drops to a low level under control of the exclusive OR-gate 197. Then, the third distribution $k_3$ from distribution circuit 200 disappears in response to the correction signal $z_2$ with low level, and simultaneously the third drive signal from drive circuit 220 disappears. Thus, the counterclockwise rotation of motor 20 is stopped due to disappearance of the third drive signal from drive circuit 220 to cease the above-noted decrease of the throttle opening angle.

When the timing signal generator 130 produces a gate signal $b_2$ with a period $T_2$ of time and also produces latch and preset signals $d_2$, $e_2$ and reset signals $f_2$, $g_2$, as previously described, the counter circuit 164 of command-speed set circuit 160 acts to complete the count operation thereof at the leading edge of gate signal $b_2$ so as to store therein the counted result as a twelve-bit binary coded signal u indicative of the period $T_1$ of time of gate signal $b_1$, and simultaneously the counter circuit 182 of calculation circuit 180 completes the count operation thereof to produce the counted result as a twelve-bit binary coded signal indicative of the period $T_1$ of time of gate signal $b_1$. At the same time, the counter circuit 183 of calculation circuit 180 acts to complete the count down operation thereof in such a manner to produce the counted-down result as an eight-bit binar coded signal indicative of an absolute value of a time difference between the period $T_1$ of time and the previously counted value in the counter circuit 182. At this stage, a low level signal appears from D-flip flop 185 of calculation circuit 180. In addition, the period $T_1$ of time is shorter than the previously counted value in the counter circuit 182 because of acceleration of the vehicle, and the period $T_2$ of time is assumed to be a little shorter than the period $T_1$ of time in spite of the above-noted restraint to acceleration of the vehicle.

When the latch signal $d_2$ appears from the timing signal generator 130, as previously described, D-flip flop 142b of control signal generator 140 acts to produce a high level signal k (see FIG. 5) during generation of the command-speed set signal j from D-flip flop 142a, the latch circuit 186 of calculation circuit 180 latches therein the above-noted binary coded signal indicative of the period $T_1$ of time from counter circuit 183 to generate the latched signal as a difference signal w, and D-flip flop 187 is responsive to the low level signal from D-flip flop 185 to produce a sign signal $w_1$ with a high level or a positive sign. When the preset signal $e_2$ appears from the timing signal generator 130, as previously described, the counter circuit 171 of calculation circuit 170 presets therein the binary coded signal u indicative of the period $T_1$ of time from set circuit 160 and starts to count down the value of preset signal u at the trailing edge of gate signal $b_2$ in accordance with a series of clock signals $C_1$ through NOR-gate 161 from clock circuit 110. Simultaneously, the counter circuit 183 of calculation circuit 180 presets therein the binary coded signal indicative of the period $T_1$ of time from counter circuit 182 and starts to count down the value of the preset signal at the trailing edge of gate signal $b_2$ in accordance with a series of clock signals $C_1$ through OR-gate 181 from clock circuit 110. At this stage, D-flip flops 173, 185 of calculation circuits 170, 180 act to produce a low level signal respectively.

When the preset signal $e_2$ appears from the timing signal generator 130, as described above, the down counter 192 of correction signal generator 190 presets therein the difference signal w from calculation circuit 180 to produce a high level signal therefrom and starts to count down the value of the preset signal w in accordance with a series of clock signals $C_4$ so that NOR-gate 198 and OR-gate 199 act to produce first and second correction signals $z_1$ and $z_2$ with low and high levels respectively. Thus, the drive circuit 220 is controlled by the distribution circuit 200 responsive to the correction signals $z_1$ and $z_2$ respectively with low and high levels in relation to the high level of sign signal $w_1$ to generate a third drive signal upon receipt of which the motor 20 is rotated counterclockwise to further decrease the actual throttle opening angle, as previously described. This results in further restraint to acceleration of the vehicle. Upon completion of the count down operation of counter 192, the second correction signal $z_2$ from OR-gate 199 drops to a low level, and the third drive signal from drive circuit 220 disappears under control of distribution circuit 200 to stop the counterclockwise rotation of motor 20. Additionally, in the calculation circuit 180, the counter circuit 182 is reset by the reset signal $g_2$ from timing signal generator 130 and starts to count a series of clock signals $C_1$ from OR-gate 181 at the trailing edge of gate signal $b_2$.

When the timing signal generator 130 produces a gate signal $b_3$ with a period of time $T_3$ and also produces latch and preset signals $d_3$, $e_3$ and reset signals $f_3$, $g_3$, as previously described, the counter circuit 182 of calculation circuit 180 completes the count operation thereof at the leading edge of gate signal $b_3$ to generate a binary coded signal indicative of the period $T_2$ of time of gate signal $b_2$, and simultaneously each of the counter circuits 171, 183 of respective calculation circuits 170, 180 completes the count down operation thereof to generate a binary coded signal indicative of an absolute value of the time difference $(T_1-T_2)$. At this stage, the period of time $T_3$ of gate signal $b_3$ is assumed to be longer than those of gate signals $b_1$, $b_2$. When the latch signal $d_3$ appears from timing signal generator 130, as previously described, RS-flip flop 143 of control signal generator 140 acts to generate an operation signal $m_b$ (see FIG. 5) under control of D-flip flop 142c during generation of the high level signal k from D-flip flop 142b, the latch circuit 174 of calculation circuit 170 latches therein the binary coded signal indicative of the time difference $|T_1-T_2|$ from counter circuit 171 to produce the latched signal as a difference signal v, and D-flip flop 175 produces a sign signal $v_1$ with a low level or a positive sign in relation to the low level signal from D-flip flop 173. At the same time, the latch circuit 186 of calculation circuit 180 latches therein the binary coded signal indicative of the time difference $|T_1-T_2|$ from counter circuit 183 to produce the latched signal as a difference signal w, and D-flip flop 187 receives the low level signal from D-flip flop 185 to produce a sign signal $w_1$ with a high level or a positive sign.

When the preset signal $e_3$ appears from the timing signal generator 130, as previously described, both the down counters 192 and 193 of correction signal generator 190 are controlled by the inverter 191 to preset therein the difference signal w indicative of the time difference $|T_1-T_2|$ and the difference signal v indicative of the time difference $|T_1-T_2|$ respectively. Then, the down counter 192 produces a high level signal therefrom and starts to count down the value of difference signal w in accordance with a series of clock signals $C_4$. Meanwhile, the down counter 193 produces a high level signal therefrom when inhibited in its count down operation by AND-gate 193a responsive to the high level signal from counter 192 and a high level signal from exclusive OR-gate 194 based on the sign signals $v_1$ and $w_1$ with low and high levels respectively from calculation circuits 170 and 180. When AND-gate 195 produces a high level signal in response to the high level signal from down counter 193 during generation of the operation signal $m_b$ from control signal generator 140, OR-gate 199 acts to generate a second correction signal $z_2$ with a high level under control of AND-gate 196 responsive to the high level signals from exclusive OR-gate 194 and AND-gate 195. In addition, NOR-gate 198 acts to produce a first correction signal $z_1$ with a low level due to the above-noted function of exclusive OR-gate 194.

Then, the distribution circuit 200 is responsive to the correction signals $z_1$ and $z_2$ respectively with low and high levels from correction signal generator 190 to produce a third distribution signal $k_3$ in relation to the high level of sign signal $w_1$. Thus, the drive circuit 220 is responsive to the third distribution signal $k_3$ from distribution circuit 220 to conduct the counterclockwise rotation of motor 20 so as to decrease the actual throttle opening angle. This further restrains the rate of increase of acceleration of the vehicle. Upon completing the count down operation, the down counter 192 produces a low level signal therefrom, and the down counter 193 is permitted in its count down operation by AND-gate 193a to continuously generate the high level signal therefrom and starts to count down the value of difference signal v in accordance with a series of clock signals $C_3$ through AND-gate 193b from clock circuit 110. Thus, the correction signal $z_2$ from OR-gate 199 is maintained in its high level under control of the exclusive OR-gate 197 responsive to the low level signal from down counter 192 during generation of the high level signal from AND-gate 195. Upon completion of the count down operation, the counter 193 acts to produce a low level signal therefrom to drop the second correction signal $z_2$ from OR-gate 199 to a low level under control of AND-gate 195 and exclusive OR-gate 197. As a result, the drive circuit 220 cooperates with the distribution circuit 200 responsive to the second correction signal $z_2$ with low level from OR-gate 199 to stop the counterclockwise rotation of motor 20 and also the decrease of the throttle opening angle.

From the above description, it will be understood that under acceleration of the vehicle before generation of the operation signal $m_b$ from timing signal generator 130 after the actuation of set switch 40, the throttle opening angle is decreased due to the width of the second correction signal $z_2$ defined by the difference signal w to effectively the rate of increase of the actual vehicle speed and to control the vehicle speed toward the command value smoothly. In this case, because the period of time of gate signal $b_i$ is defined based on the divisional frequency ratio of frequency divider 130B in relation to the actual vehicle speed upon actuation of set switch 40, the value of difference signal w is precisely calculated in the acceleration calculation circuit 180 to ensure the above-noted smooth control of the vehicle speed to the command value.

When the actual vehicle speed starts to decrease due to increase of loads against the vehicle under this condition, it is detected by the speed sensor 30 as a series of electric signals, each of which is reshaped by the wave shaper 120 and applied to the timing signal generator 130 as a rectangular pulse signal a in sequence. When the timing signal generator 130 produces a gate signal $b_m$ with a period $T_m$ of time and also produces latch and preset signals $d_m$, $e_m$ and reset signals $f_m$, $g_m$, as previously described, the counter circuit 171 of calculation circuit 170 is responsive to the preset signal $e_m$ to preset therein the binary coded signal u from set circuit 160 and starts to count down the value of preset signal u at the trailing edge of gate signal $b_m$ in accordance with a series of clock signals $C_1$ during generation of a low level signal from D-flip flop 173. At the same time, the counter circuit 183 of calculation circuit 180 presets therein a binary coded signal indicative of the period $T_{m-1}$ of time counted previously in the counter circuit 182 and starts to count down the value of the preset signal at the trailing edge of gate signal $b_m$ in accordance with a series of clock signals $C_1$ during generation of a low level signal from D-flip flop 185. In addition, the period $T_m$ of time of gate signal $b_m$ is longer than the period $T_1$ of time of gate signal $b_1$. The period $T_m$ of time is assumed to be longer than a period $T_{m-1}$ of time of a gate signal $b_{m-1}$ which was issued from the timing signal generator 130 prior to the gate signal $b_m$.

When the counter circuit 171 of calculation circuit 170 completes the count down operation thereof to drop the high level signal from counter 171c to a low level, D-flip flop 173 produces a high level signal under control of NOR-gate 172 responsive to one of clock signals $C_1$ through NOR-gate 161. Then, the counter circuit 171 is responsive to the high level signal from D-flip flop 173 to count up the remainder of clock signals $C_1$ defined by the period $T_m$ of time of gate signal $b_m$. When the counter circuit 183 of calculation circuit 180 completes the count down operation thereof to drop the high level signal from counter 183c to a low level, D-flip flop 185 produces a high level signal under control of NOR-gate 184 responsive to one of clock signals $C_1$ from OR-gate 181. Then, the counter circuit 183 is responsive to the high level signal from D-flip flop 185 to count up the remainder of clock signals $C_1$ defined by the period $T_m$ of time.

When the timing signal generator 130 produces a gate signal $b_{m+1}$ with a period $T_{m+1}$ of time and also produces latch and preset signals $d_{m+1}$, $e_{m+1}$ and reset signals $f_{m+1}$, $g_{m+1}$, as previously described, the counter circuit 171 completes the count up operation thereof at the leading edge of gate signal $b_{m+1}$ to produce a binary coded signal indicative of a time difference $|T_1-T_m|$ corresponding to the actual speed difference of the vehicle, and simultaneously the counter circuit 183 completes the count up operation thereof to produce a binary coded signal indicative of a time difference $|T_{m-1}-T_m|$ corresponding to the actual acceleration of the vehicle. Then, the latch circuit 174 of calculation circuit 170 is responsive to the latch signal $d_{m+1}$ to latch and produce the binary coded signal indicative of the time difference $|T_1-T_m|$ as a difference signal v, and simultaneously D-flip flop 175 generates a sign signal $v_1$ with a high level or a negative sign during generation of the high level signal from D-flip flop 173. The latch circuit 186 of calculation circuit 180 is also responsive to the latch signal $d_{m+1}$ to latch and produce the binary coded signal indicative of the time difference $|T_{m-1}-T_m|$ as a difference signal w, and simultaneously D-flip flop 187 receives the high level signal from D-flip flop 185 to generate a sign signal w with a low level or a negative sign.

When the preset signal $e_{m+1}$ appears from timing signal generator 130, as previously described, the down counters 192 and 193 of correction signal generator 190 preset therein the difference signals w and v from calculation circuits 180 and 170 under control of inverter 191 respectively. Then, the down counter 192 produces a high level signal and starts to count down the value of difference signal w in accordance with a series of clock signals $C_4$ from AND-gate 192a, meanwhile the down counter 193 is inhibited in its count down operation on a basis of the sign signals $v_1$ and $w_1$ with high and low levels respectively from calculation circuits 170 and 180 to produce a high level signal, as described above. Then, AND-gate 195 produces a high level signal in response to the high level signal from counter 193 during generation of the operation signal $m_b$ from timing signal generator 130, and OR-gate 199 produces a second correction signal $z_2$ with a high level under control of AND-gate 196 responsive to the high level signal from AND-gate 195 and a high level signal issued from exclusive OR-gate 194 based on the sign signals $v_1$ and $w_1$ respectively with high and low levels. Additionally, NOR-gate 198 of correction signal generator 190 produces a first correction signal $z_1$ with a low level in response to the high level signal from exclusive OR-gate 194.

Then, the distribution circuit 200 is responsive to the correction signals $z_1$ and $z_2$ respectively with low and high levels from correction signal generator 190 in relation to the low level of sign signal $w_1$ to produce a second distribution signal $k_2$ upon receipt of which the drive circuit 220 acts to produce a second drive signal, as previously described. Thus, the motor 20 is clockwisely rotated upon receiving the second drive signal from drive circuit 220 and cooperates with the rack-and-pinion 22 to increase the actual throttle opening angle. As a result, acceleration of the vehicle is increased due to the increase of the throttle opening angle to control the actual vehicle speed toward the desired value. Upon completing the count down operation, the down counter 192 produces a low level signal in response to which the counter 193 is permitted in its count down operation to continuously generate the high level signal and starts to count down the value of difference signal v in accordance with a series of clock signals $C_3$ from AND-gate 193b. In this instance, the second correction signal $z_2$ from OR-gate 199 is maintained in its high level under control of the exclusive OR-gate 197 responsive to the low and high level signals from down counter 192 and AND-gate 195. Upon completion of the count down operation, the counter 193 acts to produce a low level signal so as to drop the second correction signal $z_2$ from OR-gate 199 to a low level under control of AND-gate 195 and exclusive OR-gate 197. Then, the drive circuit 220 cooperates with the distribution circuit 200 responsive to the correction signal $z_2$ with low level from OR-gate 199 to cease generation of the second drive signal therefrom. As a result, the clockwise rotation of motor 20 is stopped due to disappearance of the second drive signal to stop the increase of the throttle opening angle.

From the above description, it will be understood that under increase of the vehicle loads after generation of the operation signal $m_b$, the throttle opening angle is increased due to the width of the correction signal $z_2$ defined by the total value of difference signals v, w to effectively restrain the rate of decrease of the actual vehicle speed and to smoothly control the vehicle speed toward the command value. In this case, because the period of time of gate signal $b_i$ is defined based on the divisional frequency ratio of the frequency divider 130B related to the actual vehicle speed upon generation of the subsidiary set signal $m_c$ from timing signal generator 130, the values of difference signals v and w are precisely calculated in the calculation circuits 170 and 180 respectively to ensure the above-noted smooth control of the vehicle speed to the command value.

Assuming that at this stage the timing signal generator 130 produces a gate signal $b_M$ with a period $T_M$ of time and also produces latch and preset signals $d_M$, $e_M$ and reset signals $f_M$, $g_M$, as previously described, the counter circuit 171 of calculation circuit 170 is responsive to the preset signal $e_M$ to preset therein the binary coded signal u from set circuit 160 and starts to count down the value of preset signal u at the trailing edge of gate signal $b_M$ in accordance with a series of clock signals $C_1$ through NOR-gate 161 during generation of a low level signal from D-flip flop 173, and simultaneously the counter circuit 183 of calculation circuit 180 presets therein a binary coded signal indicative of the period $T_{M-1}$ of time counted previously in the counter circuit 182 and starts to count down the value of the preset signal in accordance with a series of clock signals $C_1$ during generation of a low level signal from D-flip flop 185. In this case, the period $T_M$ of time of gate signal $b_M$ is still longer than the period $T_1$ of time of gate signal $b_1$ due to the vehicle loads but is shorter than a period $T_{M-1}$ of time of a gate signal $b_{M-1}$ which was issued from timing signal generator 130 prior to the gate signal $b_M$. Upon completing count down operation, the counter circuit 183 acts to produce a binary coded signal indicative of an absolute value of a time difference $(T_{M-1}-T_M)$ or the remaining value of the period $T_{M-1}$ of time corresponding to controlled acceleration of the vehicle. When the counter circuit 171 completes the count down operation thereof to drop the high level signal from counter 171c to a low level, D-flip flop 173 acts to generate a high level signal, as previously described, so that the counter circuit 171 starts to count up the remainder of clock signals $C_1$ defined by the period $T_M$ of time of gate signal $b_M$.

When the timing signal generator 130 produces a gate signal $b_{M+1}$ with a period $T_{M+1}$ of time and also produces latch and preset signals $d_{M+1}$, $e_{M+1}$ and reset signals $f_{M+1}$, $g_{M+1}$, as previously described, the counter circuit 171 completes the count up operation thereof at the leading edge of gate signal $b_{M+1}$ to produce a binary coded signal indicative of a time difference $|T_1-T_M|$ corresponding to controlled speed difference of the vehicle. Subsequently, the latch circuit 174 is responsive to the latch signal $d_{M+1}$ to latch and produce the binary coded signal indicative of the time difference $|T_1-T_M|$ as a difference signal v, and simultaneously D-flip flop 175 produces a sign signal $v_1$ with a high level or a negative sign on a basis of the high level signal from D-flip flop 173. The latch circuit 186 is also responsive to the latch signal $d_{M+1}$ to latch and produce the binary coded signal indicative of the time difference $|T_{M-1}-T_M|$ as a difference signal w, and simultaneously D-flip flop 187 receives the low level signal from D-flip flop 185 to produce a sign signal $w_1$ with a high level or a positive sign.

When the down counters 192 and 193 of correction signal generator 190 are responsive to the preset signal $e_{M+1}$ to preset therein the difference signals w and v under control of inverter 191 respectively, the counter 192 produces a high level signal and starts to count down the value of difference signal w in accordance with a series of clock signals $C_4$, and simultaneously the down counter 193 is permitted in its count down operation by AND-gate 193a under control of exclusive OR-gate 194 based on the high level of each of the sign signals $v_1$, $w_1$ to produce a high level signal and starts to count down the value of difference signal v in accordance with a series of clock signals $C_3$. Then, NOR-gate 198 is responsive to the high level signal from down counter 192 to produce a first correction signal $z_1$ with a low level, and OR-gate 199 produces a second correction signal $z_2$ with a low level under control of AND-gates 195, 196 and exclusive OR-gates 194, 197 based on the operation signal $m_b$, sign signals $v_1$, $w_1$ respectively with high level and high level signals from counters 192, 193.

If the value $|T_{M-1}-T_M|$ of difference signal w is larger than the value $|T_1-T_M|$ of difference signal v, the down counter 193 completes in its count down operation prior to that of down counter 192 to produce a low level signal at its carry-out terminal CO. Then, the second correction signal $z_2$ from OR-gate 199 rises to a high level under control of the exclusive OR-gate 197 and AND-gate 195 responsive to the low level signal from counter 193 during generation of the high level signal from counter 192. Thus, the drive circuit 220 cooperates with the distribution circuit 200 responsive to the correction signals $z_1$ and $z_2$ respectively with low and high levels in relation to the high level of sign signal $w_1$ to produce a third drive signal upon receipt of which the motor 20 is rotated counterclockwise to decrease the actual throttle opening andle under control of the rack-and-pinion 22. Upon completing the count down operation, the down counter 192 produces a low level signal therefrom to drop the correction signal $z_2$ from OR-gate 199 to a low level under control of the exclusive OR-gate 197. Thus, the drive circuit 220 cooperates with the distribution circuit 200 responsive to the correction signal $z_2$ with low level to cease generation of the third drive signal therefrom so that the counterclockwise rotation of motor 20 is stopped to cease the decrease of the throttle opening angle.

If the value $|T_{M-1}-T_M|$ of difference signal w is smaller than the value $|T_1-T_M|$ of difference signal v, the down counter 192 completes in its count down operation prior so as to that of counter 193 to produce a low level signal therefrom to rise the first correction signal $z_1$ from NOR-gate 198 to a high level. The second correction signal $z_2$ from OR-gate 199 also rises to a high level under control of the exclusive OR-gate 197 responsive to the low level signal from counter 192. Thus, the drive circuit 220 cooperates with the distribution circuit 200 responsive to the correction signals $z_1$ and $z_2$ respectively with high level in relation to the high level of sign signal $w_1$ to produce a second drive signal upon receipt of which the motor 20 is clockwisely rotated to increase the actual throttle opening angle. Upon completion of the count down operation, the down counter 193 produces a low level signal to drop the correction signal $z_2$ from OR-gate 199 to a low level under control of the exclusive OR-gate 197 and AND-gate 195 responsive to the low level signal from counter 193. Thus, the drive circuit 220 cooperates with the distribution circuit 200 responsive to the correction signal $z_2$ with low level to cease generation of the second drive signal therefrom so that the clockwise rotation of motor 20 is stopped to cease the increase of the throttle opening angle.

From the above description, it will be understood that after generation of the operation signal $m_b$, the throttle opening angle is also decreased or increased due to the width of the correction signal $z_2$ defined by the difference value between the difference signals v, w, thereby to smoothly control the actual vehicle speed toward the command value. In this case, because the period of time of gate signal $b_i$ is defined based on the divisional frequency ratio of frequency divider 130B related to the actual vehicle speed upon generation of the subsidiary set signal $m_c$ from control signal generator 140, the values of difference signals v, w are precisely calculated in the calculation circuits 170 and 180 respectively to ensure the above-noted smooth control of the vehicle speed to the command value.

Although in the above operation, decrease of the vehicle speed caused by increase of the vehicle loads is controlled by the speed control apparatus of the present invention, it will be easily understood that increase of the vehicle speed caused by decrease of the vehicle loads will be also effectively controlled by the speed control apparatus in the substantially same as the above-mentioned operation.

In case an operator of the vehicle wishes to increase the first command speed up to a higher or second command value, the acceleration switch 60 is manually closed to produce an electric signal which is reshaped by the wave shaper 146a of control signal generator 140 into a reshaped signal. When the inverter 146b of control signal genrator 140 is responsive to the reshaped signal from wave shaper 146a to produce an acceleration signal n (see FIG. 4), the distribution circuit 200 acts to generate a second distribution signal $k_2$ therefrom in response to which the drive circuit 220 produces a second drive signal to clockwisely rotate the motor 20 for increasing the actual throttle opening angle. When the reshaped signal appears from the wave shaper 146a of control signal generator 140, as previously described, RS-flip flop 141 is controlled by NAND-gate 141b to produce a high level signal i in response to which the inverter 147c ceases generation of the subsidiary set signal $m_c$ from AND-gate 147. Then, AND-gate 133d of timing signal generator 130 is permitted under control of inverter 133c responsive to disappearance of the subsidiary set signal $m_c$ to produce a latch signal L again, as previously described.

When the vehicle speed reaches the second command value, the acceleration switch 60 is released to cease generation of the reshaped signal from wave shaper 146a of control signal generator 140, and the inverter 146b also ceases generation of the acceleration signal n therefrom. Thus, the drive circuit 220 is controlled by the distribution circuit 220 responsive to disappearance of the acceleration signal n to stop the clockwise rotation of motor 20 so as to cease the increase of the throttle opening angle. When a preset signal $e_i$ appears from timing signal generator 130 after disappearance of the acceleration signal n, D-flip flop 142a of control signal generator 140 produces newly a command-speed set signal j during generation of the high level signal i from RS-flip flop 141. Then, RS-flip flop 141 drops the high level signal i to a low level in response to a reset signal $f_i$ issued from timing signal generation 130 immediately after generation of the command-speed set signal j, and AND-gate 147 is controlled by the inverter 147c to generate a subsidiary set signal $m_c$ again. Thus, a binary coded signal latched in the latch 135 of frequency divider 130B immediately before generation of the subsidiary set signal $m_c$ is maintained in the latch 135 after generation of the subsidiary set signal $m_c$ to newly define the divisional frequency ratio of programmable down counter 136b. In this case, because the frequency of pulse signals appearing from wave shaper 120 at the second command speed of the vehicle is higher than that of the pulse signals issued from wave shaper 120 at the first vehicle command speed, the value of the binary coded signal maintained newly in the latch 135 is larger than that of the binary coded signal which was maintained in the latch 135 at the first vehicle command speed. In other words, because the denominator of the divisional frequency ratio defined newly in the down counter 136b is larger than that of the divisional frequency ratio defined in the counter 136b at the first vehicle command speed, a period Ti of time of a gate signal $b_i$ appearing from timing signal generator 130 at the second vehicle command speed is maintained substantially equal to that of gate signal $b_i$ issued from timing signal generator 130 at the first vehicle command speed.

As understood from the above description, in spite of rise of the vehicle command speed, calculation of the command-speed set circuit 160 related to the new command-speed set signal j is, therefore, conducted in dependence upon the number of clock signals $C_1$ equal substantially to that of clock signals $C_1$ defined by the period $T_i$ of time of gate signal $b_i$ at the first command speed, and calculation of each of the calculation circuits 170, 180 is also conducted in dependence upon the number of clock signals $C_1$ defined by the period Ti of time of gate signal $b_i$ corresponding to the second or first command speed. In other words, in spite of shortening of a time period of each of pulse signals a from wave shaper 120 caused by rise of the vehicle command speed, the period Ti of time of gate signal $b_i$ at the second vehicle command speed is modified in the substantially same value as that of gate signal $b_i$ at the first vehicle command speed to prevent lowering of resolution in each calculation of set circuit 160 and calculation circuits 170, 180. This means to ensure precise control of the actual vehicle speed toward the second command value in the same as that of the actual vehicle speed toward the first command value.

It will be clearly understood from the following description that resolution in calculation of each of the calculation circuits 170, 180 is maintained substantially in a constant value over a wider range of the actual vehicle speed.

(1) In case the period Ti of time of gate signal $b_i$ changes in dependence upon changes of the vehicle command speed:

Resolution $B_v$ in calculation of the calculation circuit 170, for example one of the up-down counters 171a to 171c is expressed as the following equation (3).

$$B_v = \frac{V_s}{\frac{\beta}{V_s} \cdot f_{c1}} - \frac{V_{so}}{\frac{\beta}{V_{so}} \cdot f_{c1}} \left( \frac{\text{Km/h}}{N_{c1}} \right) \quad (3)$$

where $f_{c1}$ indicates the frequency (Hz) of clock signals $C_1$, where $N_{c1}$ indicates the number of clock signals $C_1$, where $\beta$ indicates a constant ($N_{c1}$.Km/h.Hz), and where $V_s = V_{so} - \Delta V_s$.

Resolution $B_\alpha$ in calculation of the calculation circuit 180, for example one of the up-down counters 183a to 183c is also expressed as the following equation (4).

$$B_\alpha = \frac{V_{s2}}{\frac{\beta}{V_{s2}} \cdot f_{c1}} - \frac{V_{s1}}{\frac{\beta}{V_{s1}} \cdot f_{c1}} \left( \frac{\text{Km/h}}{N_{c1}} \right) \quad (4)$$

where $V_{s1}$ indicates the actual vehicle speed before generation of a gate signal $b_i$, and where $V_{s2}$ indicates the actual vehicle speed after generation of the gate signal $b_i$.

(2) In case the period Ti of time of gate signal $b_i$ is maintained substantially in the constant value, as previously described:

Resolution $B_v'$ in calculation of one of the counter 171a to 171c expressed as the following equation (5).

$$B_v' = \frac{V_s}{\frac{\beta' V_{so}}{V_s} \cdot f_{c1}} - \frac{V_{so}}{\frac{\beta' V_{so}}{V_s} \cdot f_{c1}} \left( \frac{\text{Km/h}}{N_{c1}} \right) \quad (5)$$

where $\beta'$ indicates a constant ($N_{c1}$.Km/h.Hz).

Resolution $B_\alpha'$ in calculation of one of the counters 183a to 183c is also expressed as the following equation (6).

$$B_\alpha' = \frac{V_{s2}}{\frac{\beta' V_{so}}{V_{s2}} \cdot f_{c1}} - \frac{V_{s1}}{\frac{\beta' V_{so}}{V_{s1}} \cdot f_{c1}} \left( \frac{\text{Km/h}}{N_{c1}} \right) \quad (6)$$

In the embodiment, each of the resolutions $B_v$ and $B_v'$ is defined by a value counted in one of the counters 171a to 171c responsive to a single clock signal $C_1$, and each of the resolutions $B_\alpha$ and $B_\alpha'$ is also defined by a value counted in one of the counters 183a to 183c responsive a single clock signal $C_1$. From the above equations (3) to (6), it will be understood that each of the resolutions $B_v$ and $B_\alpha$ lowers in dependence upon rise of the vehicle command speed but each of the resolutions $B_v'$ and $B_\alpha'$ does not lower in spite of rise of the vehicle command speed. Additionally, the equations (3) to (6) are expressed respectively as in the followings, because each of the vehicle speeds $V_{so}$, $V_s$, $V_{s1}$ and $V_{s2}$ is substantially equal to each other in the embodiment.

$$B_v = (V_s - V_{so}) V_{so} / \beta f_{c1} \quad (3')$$

$$B_\alpha = (V_{s2} - V_{s1}) V_{s1} / \beta f_{c1} \quad (4')$$

$$B_v' = (V_s - V_{s0})/\beta' f_{c1} \tag{5'}$$

$$B_\alpha' = (V_{s2} - V_{s1})/\beta' f_{c1} \tag{6'}$$

These equations (3') to (6') clearly express that the resolutions $B_v'$, $B_\alpha'$ do not change in comparison with the resolutions $B_v$, $B_\alpha$.

When the cancel switch 50 is manually closed to produce a release signal h, the first transistor circuit 221 of drive circuit 220 is deactivated, and simultaneously the control signal generator 140 acts to cease generation of the operation signal $m_a$ therefrom so that the second and third transistor circuits 222, 223 of drive circuit 220 cooperate with the distribution circuit 200 to deactivate the clutch mechanism 21 and reversible motor 20. When an operation signal $m_a$ appears from the control signal generator 140 upon closure of the resume switch 70 after disappearance of the release signal h from cancel switch 50, the distribution circuit 200 is again permitted to cooperate with the transistor circuits 222, 223 so as to control the throttle actuator AC, as previously described. In case the actual vehicle speed exceeds the maximum value controllable by the speed control apparatus, the cancellation circuit 150 produces a release signal $s_2$ so as to deactivate the drive circuit 200 in the same operation as that of the cancel switch 50. Additionally, actuation of resume switch 70 is ineffective in relation to the control signal generator 140 in case a release signal $s_1$ appears from the cancellation circuit 150.

For practice of the present invention, the electric reversible motor 20 of throttle actuator AC may be replaced with various sources of power such as an oil-hydraulic motor, a pneumatic motor and the like. In this case, the rack-and-pinion 22 may be also replaced with a cam-mechanism.

Although in the above embodiment the speed sensor 30 having the reed switch 32 is adapted as means for detecting the actual vehicle speed, it may be replaced with a sensor in the form of an AC generator or a photo-coupler having a photo transistor and a light emission diode. Futhermore, the command-speed set circuit 160 may be replaced with an electronic circuit in which a binary coded signal indicative of a period of time corresponding to a desired vehicle speed is produced by manipulation of a digital code switch independently of the clock circuit 110, timing signal generator 130 and control signal generator 140.

While in the above embodiment the present invention is adapted to the throttle valve 12 of internal combustion engine 10, it may be also adapted to a diesel engine in which the quantity of fuel supplied from a fuel source into the combustion chamber of the diesel engine is controlled by the throttle actuator AC under control of the control circuit EC. In this case, the control circuit EC may be replaced with a digital computer programmed to perform the same operation as that of the control circuit EC in accordance with a predetermined computer program. The control circuit EC may be also replaced with an analog control circuit to conduct the same operation as that of the control circuit EC.

For each calculation of a speed change of the actual vehicle speed and a speed difference between the actual and command vehicle speeds in the above embodiment, the total time period (NT) which is given by the number (N) of pulse signals a corresponding to the speed change or difference in relation to a time period (T) of each of the pulse signals a is calculated in dependence on a time period (t) of each of clock signals $C_1$, and a divisional frequency ratio against the frequency of each of the pulse signals a is also changed in dependence on a digital value indicative of the vehicle command speed such that the number (N) of pulse signals a is modified to substantially maintain TN/t a constant. However, the time period (t) of each of clock signals $C_1$ may be also modified inversely in proportion to the digital value indicative of the vehicle command speed in replacement of modification of the number (N) of each of pulse signals a to substantially maintain TN/t the constant. In this case, the frequency (f) of each of clock signals $C_1$ has only to satisfy, for instance, the following equation.

$$f = k' \cdot V_{s0} f_0$$

where k' is a constant and where $f_0$ is the high frequency of each of basic clock signals. In the concrete, a frequency divider of the variable divisional frequency ratio type is provided to sequentially divide each of the basic clock signals in frequency into an electric signal to be applied to the set and calculation circuits 160, 170, 180, and a circuit is also provided to change the variable divisional frequency ratio of the frequency divider inversely in proportion to the digital value indicative of the command speed. Furthermore, the time period (T) of each of pulse signals a may be modified in dependence on the digital value indicative of the command speed to substantially maintain TN/t the constant. In this case, a multiplier of the variable multiplying rate type is provided to determine a multiplying rate thereof inversely in proportion to the digital value indicative of the command speed in dependence on each of the pulse signals a such that the timing signal generator 130 produces repetitively a timing signal with a period of time defined by the determined multiplying rate.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A speed control method for an automotive vehicle driven by an internal combustion engine under control of control means for controlling the quantity of fuel supplied into said engine to maintain the actual speed of the vehicle to a desired value, the speed control method comprising the steps of:

producing a speed signal with a frequency responsive to the actual vehicle speed;

producing a series of clock signals at a constant frequency;

producing a command signal indicative of the desired vehicle speed;

determining a divisional frequency ratio inversely proportional to a value corresponding with the desired vehicle speed and dividing the actual frequency of the speed signal by the divisional frequency ratio to produce a timing signal with the divided frequency;

calculating a first difference between values of the command and speed signals in accordance with the clock signals defined by a period of time of the timing signal and producing a first difference signal indicative of the calculated first difference;

calculating a second difference between values of the successive speed signals in accordance with the clock signals defined by each period of time of the successive timing signals and producing a second difference signal indicative of the calculated second difference;

producing, responsive to the first and second difference signals, a correction signal related to the calculated first and second differences; and actuating said control means in response to the correction signal.

2. A speed control method for an automotive vehicle driven by an internal combustion engine under control of control means for controlling the quantity of fuel supplied into said engine to maintain the actual speed of the vehicle to a desired value, the speed control method comprising the steps of:

producing a speed signal with a frequency responsive to the actual vehicle speed;

producing a series of clock signals at a constant frequency;

producing a command signal indicative of a predetermined period of time defined by the desired vehicle speed;

determining a divisional frequency ratio inversely proportional to a value corresponding with the desired vehicle speed and dividing the actual frequency of the speed signal by the divisional frequency ratio to produce a timing signal with the divided frequency;

calculating, responsive to the timing signal, a first time difference between the predetermined period of time of the command signal and a total period of time of the clock signals defined by a period of time of the timing signal and producing a first difference signal indicative of an absolute value of the calculated first time difference and a first sign signal indicative of one of positive and negative signs of the calculated first time difference;

calculating, responsive to the timing signal, a second time difference between both the total periods of time of the clock signals defined by each period of time of the preceding and following timing signals and producing a second difference signal indicative of an absolute value of the calculated second time difference and a second sign signal indicative of one of positive and negative signs of the calculated second time difference;

calculating, responsive to the timing signal, the sum of the absolute values when respective signs of the first and second sign signals are identical to each other and calculating, responsive to the timing signal, a difference between the absolute values when respective signs of the first and second sign signals are opposite to each other;

producing a correction signal with a width defined by one of the calculated sum and difference;

selectively producing, responsive to the correction signal, first and second output signals in relation to one of the positive and negative signs of the second sign signal; and actuating said control means in response to the first and second output signals.

3. A speed control method as claimed in claim 2, further including the step of producing a control signal upon arrival of the actual vehicle speed to the desired value, and wherein the step of determining a divisional frequency ratio includes the steps of:

determining, responsive to the control signal, a divisional frequency ratio $$\left(\frac{1}{x-1}\right)$$

inversely proportional to a value (x) of the speed signal corresponding to the desired vehicle speed; and dividing, responsive to the speed signal after generation of the command signal, the actual frequency (f) of the speed signal by the divisional frequency ratio $$\left(\frac{1}{x-1}\right)$$

to produce a timing signal with the divided frequency $$\left(\frac{f}{x-1}\right).$$

4. A speed control method as claimed in claim 3, wherein the step of determining a divisional frequency ratio includes the steps of:

producing a gate signal with a predetermined width, a latch signal and a reset signal and ceasing the latch signal in response to the control signal;

counting, responsive to the reset signal, the number of the speed signals defined by the predetermined width of the gate signal and producing a binary coded signal indicative of the counted number of the speed signals;

latching, responsive to the latch signal, the binary coded signal to maintain it in response to the control signal;

counting down the value of the latched binary coded signal in accordance with the speed signals by a programmable down-counter circuit arranged to determine a divisional frequency ratio inversely proportional to a value of the latched binary coded signal, and producing a timing signal with a frequency related to the divisional frequency ratio.

5. A speed control system for an automotive vehicle driven by an internal combustion engine under control of control means for controlling the quantity of fuel supplied into said engine to maintain the actual speed of the vehicle to a desired value, the speed control system comprising:

first means for producing a speed signal with a frequency responsive to the actual vehicle speed;

second means for producing a series of clock signals at a constant frequency;

third means for producing a command signal indicative of the desired vehicle speed;

fourth means for determining a divisional frequency ratio inversely proportional to a value corresponding with the desired vehicle speed and for dividing the actual frequency of the speed signal by the divisional frequency ratio to produce a timing signal with the divided frequency;

fifth means for calculating a first difference between values of the command and speed signals in accordance with the clock signals defined by a period of time of the timing signal, said fifth means producing a first difference signal indicative of the calculated first difference;

sixth means for calculating a second difference between values of the successive speed signals in accordance with the clock signals defined by each period of time of the successive timing signals, said sixth means producing a second difference signal indicative of the calculated second difference;

seventh means responsive to the first and second difference signals for producing a correction signal related to the calculated first and second differences; and actuator means for actuating said control means in response to the correction signal.

6. A speed control system for an automotive vehicle driven by an internal combustion engine under control of control means for controlling the quantity of fuel supplied into said engine to maintain the actual speed of the vehicle to a desired value, the speed control system comprising:

first means for producing a speed signal with a frequency responsive to the actual vehicle speed;

second means for producing a series of clock signals at a constant frequency;

third means for producing a command signal indicative of a predetermined period of time defined by the desired vehicle speed;

fourth menas for determining a divisional frequency ratio inversely proportional to a value corresponding with the desired vehicle speed and for dividing the actual frequency of the speed signal by the divisional frequency ratio to produce a timing signal with the divided frequency;

fifth means responsive to the timing signal for calculating a first time difference between the predetermined period of time of the command signal and a total period of time of the clock signals defined by a period of time of the timing signal, said fifth means producing a first difference signal indicative of an absolute value of the calculated first time difference and a first sign signal indicative of one of positive and negative signs of the calculated first time difference;

sixth means responsive to the timing signal for calculating a second time difference between both the total periods of time of the clock signals defined by each period of time of the preceding and following timing signals, said sixth means producing a second difference signal indicative of an absolute value of the calculated second time difference and a second sign signal indicative of one of positive and negative signs of the calculated second time difference;

seventh means responsive to the timing signal for calculating the sum of the absolute values when respective signs of the first and second sign signals are identical to each other and for calculating a difference between the absolute values when respective signs of the first and second sign signals are opposite to each other, said seventh means producing a correction signal with a width defined by one of the calculated sum and difference;

eighth means responsive to the correction signal for selectively producing first and second output signals in relation to one of the positive and negative signs of the second sign signal; and actuator means for actuating said control means in response to the first and second output signals.

7. A speed control system as claimed in claim 6, further including ninth means for producing a control signal upon arrival of the actual vehicle speed to the desired value, and wherein said fourth means includes a frequency divider responsive to the control signal for determining a divisional frequency ratio $$\left(\frac{1}{x-1}\right)$$

inversely proportional to a value (x) of the speed signal corresponding to the desired vehicle speed, said frequency divider being responsive to the speed signal after generation of the command signal for dividing the actual frequency (f) of the speed signal by the divisional frequency ratio $$\left(\frac{1}{x-1}\right)$$

to produce a timing signal with the divided frequency $$\left(\frac{f}{x-1}\right).$$

8. A speed control system as claimed in claim 7, wherein said fourth means also includes a logic circuit for producing a gate signal with a predetermined width, a latch signal and a reset signal, said logic circuit ceasing the latch signal in response to the control signal, and wherein said frequency divider includes:

a digital counter circuit reset in response to the reset signal for counting the number of the speed signals defined by the predetermined width of the gate signal to produce a binary coded signal indicative of the counted number of the speed signals;

a latch circuit responsive to the latch signal for latching therein the binary coded signal to maintain it in response to the control signal; and a programmable down-counter circuit arranged to determine a divisional frequency ratio inversely proportional to a value of the latched binary coded signal, said down-counter circuit counting down the value of the latched binary coded signal in accordance with the speed signals to produce a timing signal with a frequency related to the divisional frequency ratio.

* * * * *